(12) United States Patent
Matsuzaki et al.

(10) Patent No.: US 7,319,491 B2
(45) Date of Patent: Jan. 15, 2008

(54) METHOD AND APPARATUS FOR PROCESSING MOTION INFORMATION

(75) Inventors: Eiichi Matsuzaki, Kanagawa (JP); Kenji Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 651 days.

(21) Appl. No.: 10/859,294

(22) Filed: Jun. 3, 2004

(65) Prior Publication Data

US 2004/0246375 A1 Dec. 9, 2004

(30) Foreign Application Priority Data

Jun. 5, 2003 (JP) .............................. 2003/160675

(51) Int. Cl.
 *H04N 7/01* (2006.01)
(52) U.S. Cl. .................... 348/452; 348/448; 348/451; 348/700
(58) Field of Classification Search ............. 348/448, 348/452, 451, 459, 620, 699, 700; 382/236; 375/240.16
See application file for complete search history.

(56) References Cited

U.S. PATENT DOCUMENTS

| | | | |
|---|---|---|---|
| 4,733,297 A | | 3/1988 | Katsumata et al. |
| 5,005,078 A | * | 4/1991 | Gillard ..................... 348/452 |
| 5,235,419 A | * | 8/1993 | Krause .................. 375/240.16 |
| 5,410,356 A | | 4/1995 | Kikuchi et al. |
| 5,521,644 A | * | 5/1996 | Sezan et al. ................ 348/452 |
| 5,671,018 A | | 9/1997 | Ohara et al. |
| 5,943,099 A | * | 8/1999 | Kim ........................... 348/448 |
| 6,141,056 A | | 10/2000 | Westerman |
| 6,215,525 B1 | | 4/2001 | Fujino |
| 6,219,103 B1 | * | 4/2001 | Sugiyama .................. 348/452 |
| 6,509,930 B1 | * | 1/2003 | Hirano et al. .............. 348/452 |
| 6,542,197 B1 | * | 4/2003 | Ko .............................. 348/452 |
| 6,606,126 B1 | * | 8/2003 | Lim et al. ................... 348/452 |
| 6,661,464 B1 | * | 12/2003 | Kokkosoulis et al. ....... 348/448 |
| 6,822,691 B1 | * | 11/2004 | Kim et al. .................. 348/452 |

(Continued)

FOREIGN PATENT DOCUMENTS

JP 8-32025 3/1996

(Continued)

*Primary Examiner*—David Ometz
*Assistant Examiner*—Jean W. Désir
(74) *Attorney, Agent, or Firm*—Fitzpatrick, Cella, Harper & Scinto

(57) ABSTRACT

A method for processing motion information in an input interlace-scanned pixel signal is disclosed. The motion information processing method includes the steps of detecting motion information of a target pixel based on difference information of a pixel signal at the same location between two fields, outputting the motion information of the target pixel by determining the motion information of the target pixel based on the detected motion information of the target pixel in the target field and the motion information of the target pixel in a past field prior to the target field, and determining whether moving pixels of at least a predetermined number are present within an area containing a plurality of adjacent pixels containing the target pixel in the target field, wherein the moving pixel has motion information indicating a moving picture. The motion information of the target pixel is determined in the outputting step with the motion information of the target pixel in the past field disregarded if the number of the moving pixels is not larger than the predetermined number.

12 Claims, 22 Drawing Sheets

U.S. PATENT DOCUMENTS

| | | | |
|---|---|---|---|
| 6,940,557 B2 * | 9/2005 | Handjojo et al. | 348/452 |
| 7,012,649 B2 * | 3/2006 | Michel | 348/448 |
| 7,034,888 B2 * | 4/2006 | Lin et al. | 348/452 |
| 7,042,512 B2 * | 5/2006 | Yang et al. | 348/452 |
| 7,095,445 B2 * | 8/2006 | Kim et al. | 348/448 |
| 7,098,957 B2 * | 8/2006 | Kim et al. | 348/452 |
| 7,098,958 B2 * | 8/2006 | Wredenhagen et al. | 348/452 |
| 7,113,222 B2 * | 9/2006 | Kodama | 348/452 |
| 7,116,372 B2 * | 10/2006 | Kondo et al. | 348/448 |
| 7,202,909 B2 * | 4/2007 | Major | 348/459 |
| 2002/0047919 A1 | 4/2002 | Kondo et al. | |
| 2003/0189674 A1 | 10/2003 | Inoue et al. | 348/738 |
| 2004/0046773 A1 | 3/2004 | Inoue et al. | 345/698 |
| 2004/0212732 A1 * | 10/2004 | Matsuzaki et al. | 348/452 |

FOREIGN PATENT DOCUMENTS

| | | |
|---|---|---|
| JP | 2000-175159 | 6/2000 |
| WO | WO 02/37847 | 5/2002 |

* cited by examiner

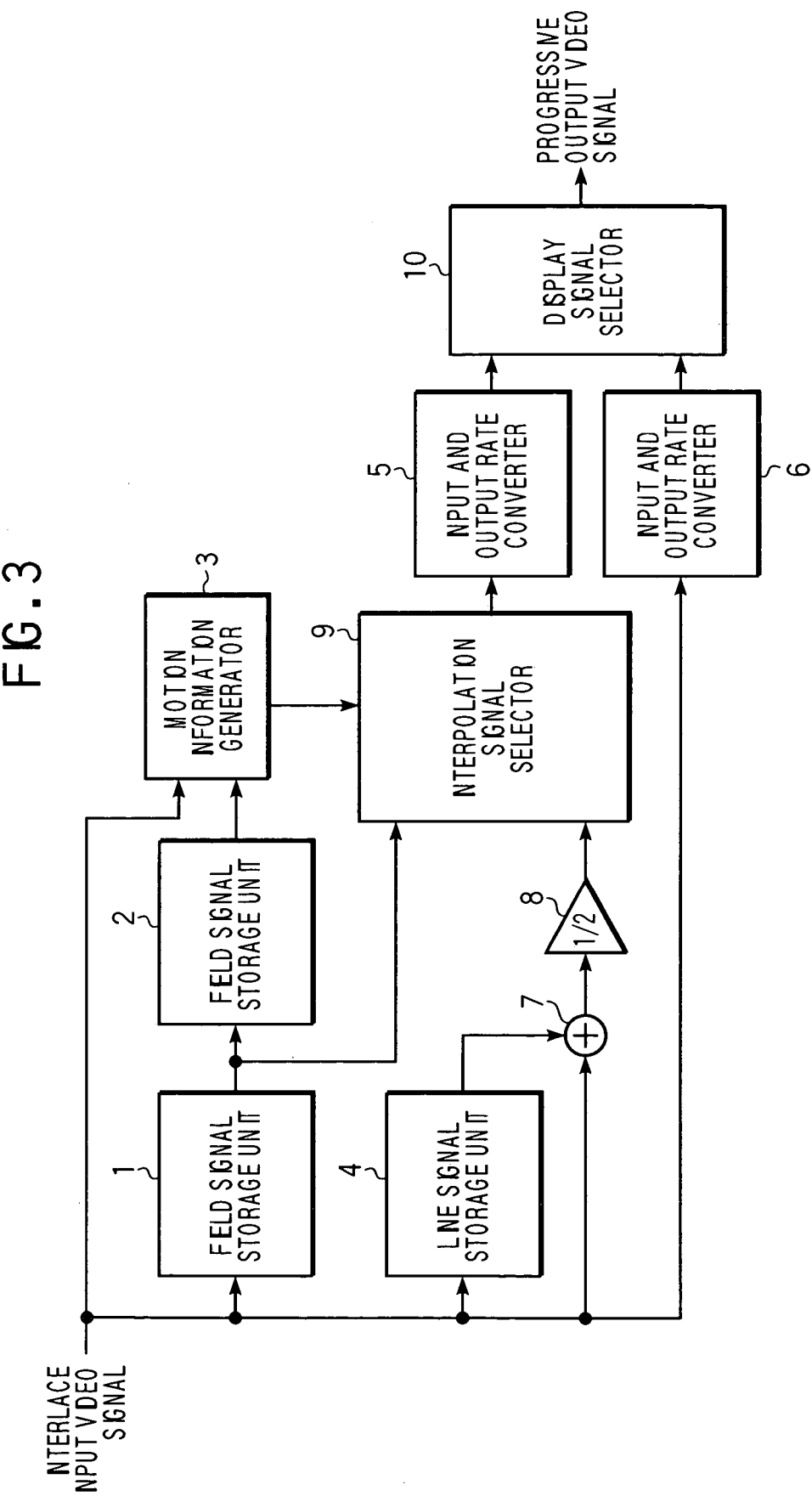

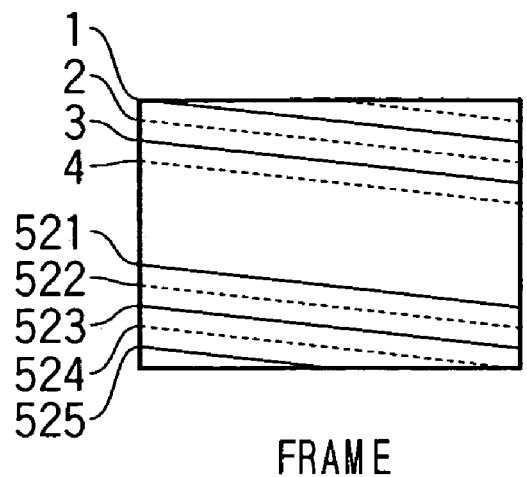
FIG. 4A  FRAME
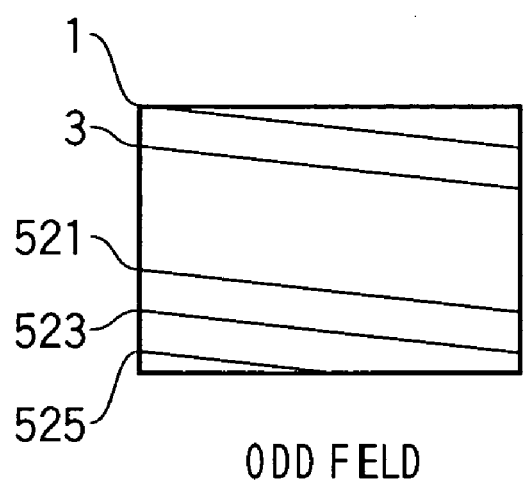
FIG. 4B  ODD FIELD
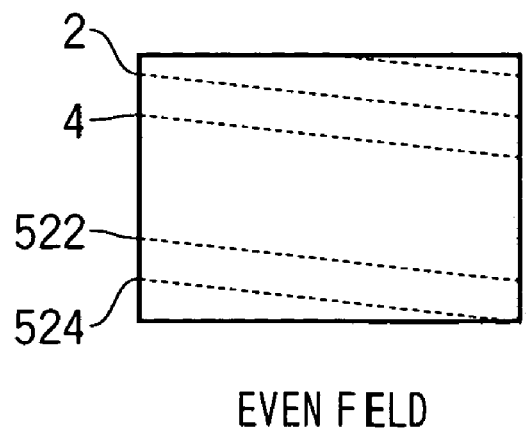
FIG. 4C  EVEN FIELD

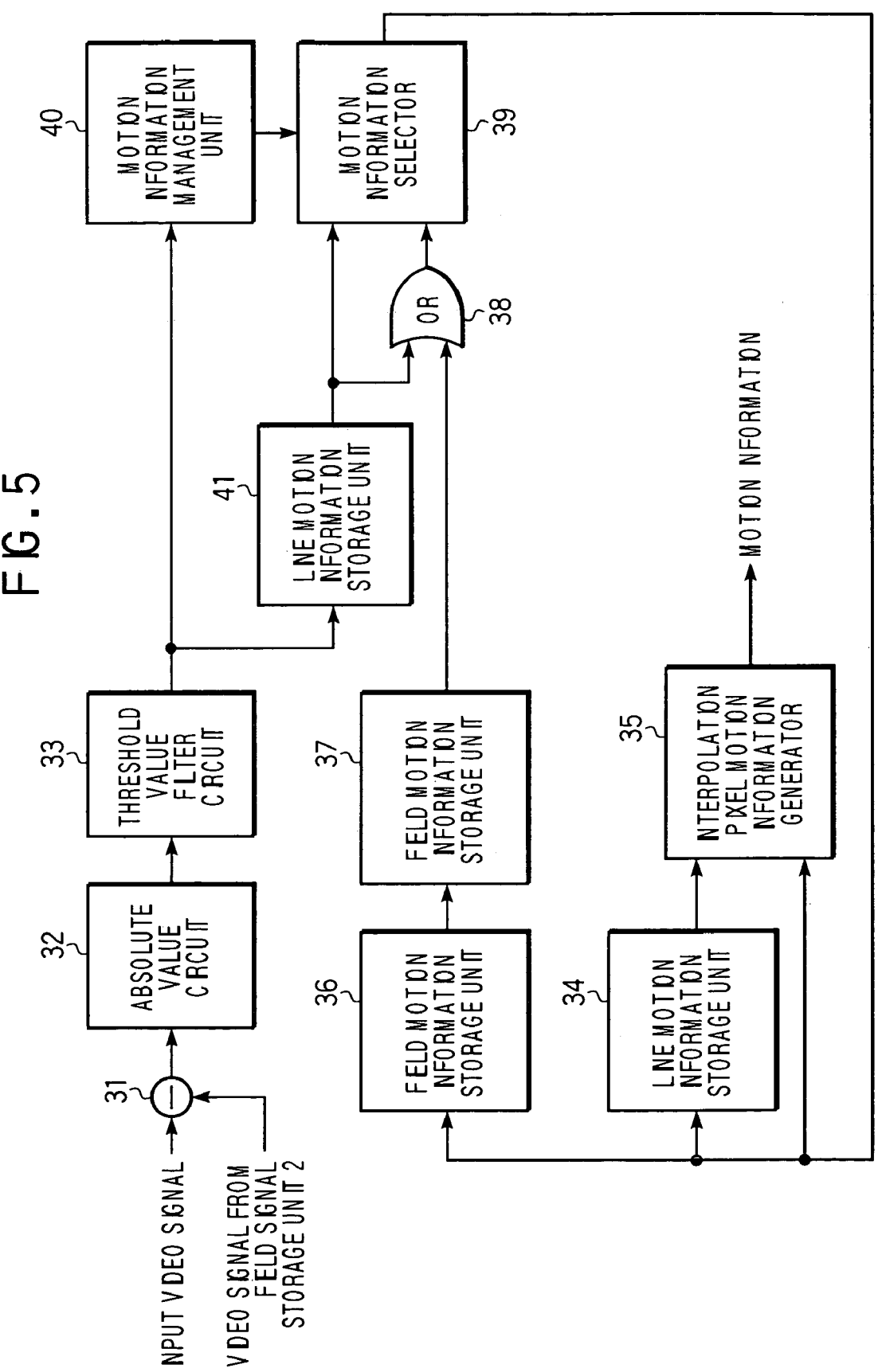

INFORMATION OUTPUT
FROM
MOTION INFORMATION
MANAGEMENT UNIT 40

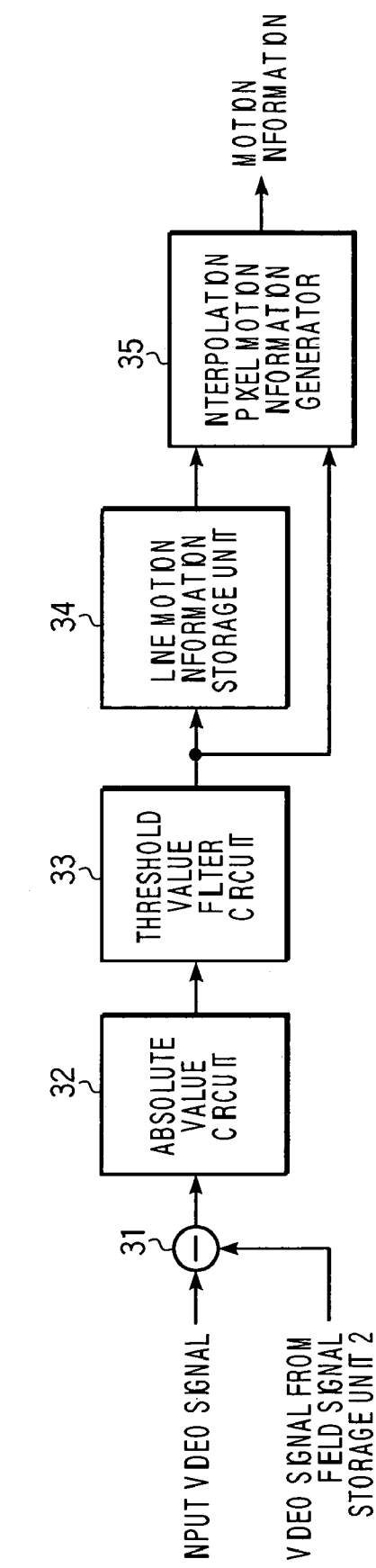

VIDEO INFORMATION OF TARGET FIELD

VIDEO INFORMATION ONE FIELD BEFORE

VIDEO INFORMATION TWO FIELDS BEFORE

VIDEO INFORMATION THREE FIELDS BEFORE

MOTION INFORMATION OF TARGET FIELD

MOTION INFORMATION ONE FIELD BEFORE

MOTION INFORMATION TWO FIELDS BEFORE

MOTION INFORMATION THREE FIELDS BEFORE

DISPLAY STATE OF
TARGET FIELD

DISPLAY STATE
ONE FIELD BEFORE

DISPLAY STATE
TWO FIELDS BEFORE

DISPLAY STATE
THREE FIELDS BEFORE

MOTION INFORMATION OF TARGET FIELD

MOTION INFORMATION ONE FIELD BEFORE

MOTION INFORMATION TWO FIELDS BEFORE

MOTION INFORMATION THREE FIELDS BEFORE

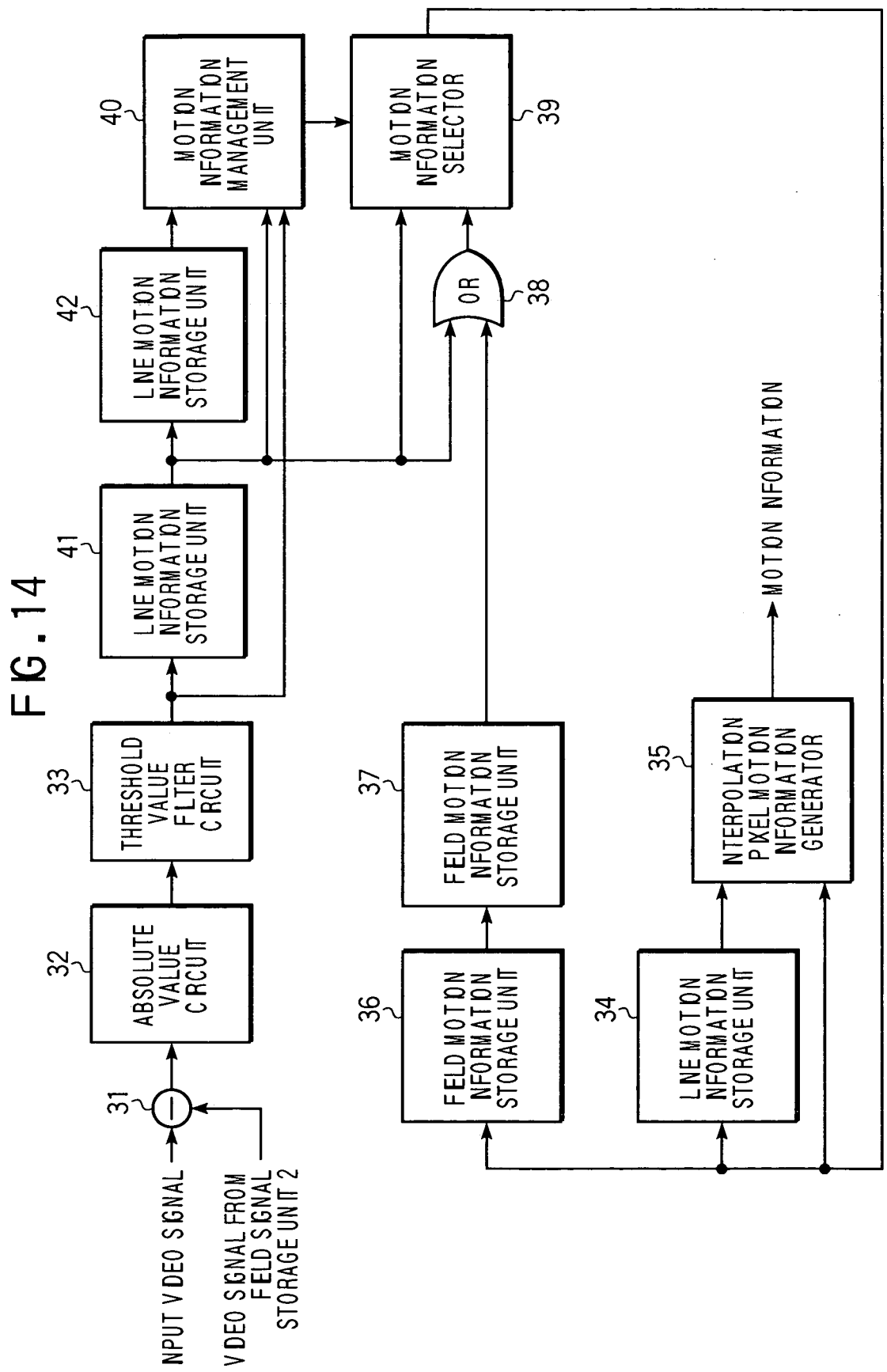

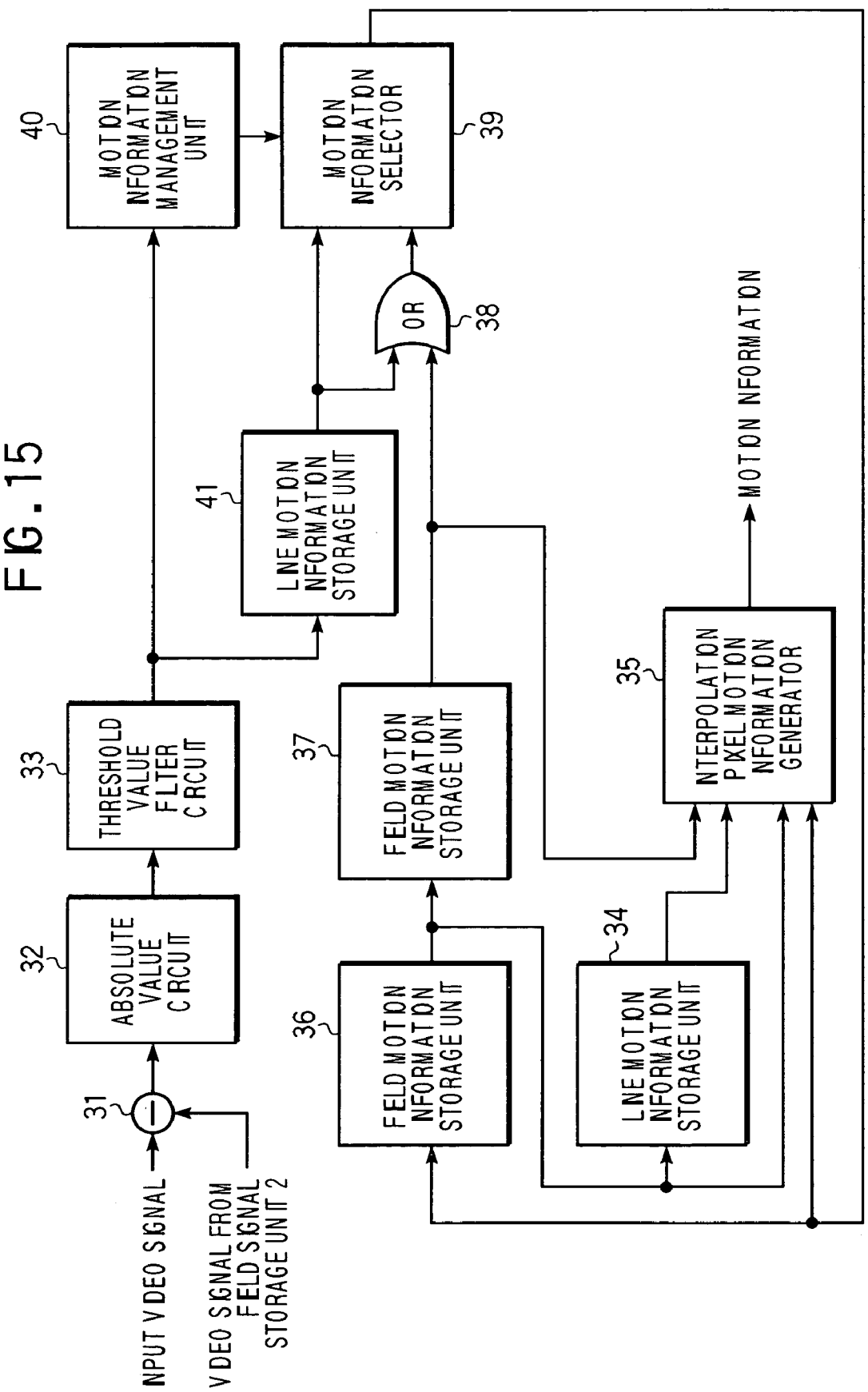

MOTION INFORMATION OF TARGET FIELD

MOTION INFORMATION ONE FIELD BEFORE

MOTION INFORMATION TWO FIELDS BERORE

MOTION INFORMATION THREE FIELDS BEFORE

METHOD AND APPARATUS FOR PROCESSING MOTION INFORMATION

BACKGROUND OF THE INVENTION

1. Field of the Invention

The present invention relates to a motion information processing method and a motion information processing apparatus for use in a video processing apparatus that handles video information of an image-pickup device and a display device. More specifically, the present invention relates to a method and an apparatus for processing image motion information in the conversion of interlace-scanned video information to progressive-scanned video information.

2. Description of the Related Art

A technique called interlace-progressive (IP) conversion is known. With that technique, interlace-scanned video information is converted to progressive-scanned video information when video is presented in progressive scanning rather than in one-line interlace scanning.

One type of IP conversion techniques, known as motion adaptive IP, switches between an inter-field interpolation and an intra-field interpolation in response to the motion of an interpolation pixel to be interpolated. In the inter-field interpolation, a value of a video signal (an interpolation value) of the interpolation pixel is determined from a (reference) video signal of a pixel of an image in an adjacent field, at the same location as an interpolation pixel. In the intra-field interpolation, an interpolation value is determined from video signals of two reference pixels in two locations at adjacent upper and lower lines within the same field as the field of the interpolation pixel. In the motion adaptive IP conversion, the interpolation value may be calculated by modifying the weighting of an inter-field interpolation value and an intra-field interpolation value in accordance with the amount of motion of the interpolation pixel.

The known IP conversion uses a difference value of the video signals of pixels at the same location between consecutive odd fields (or consecutive even fields) to detect motion of the pixels. If an motion occurs between frames, as in an even field between two odd fields, a moving picture may be mistaken for a still picture. An erroneous interpolation value thus results.

Japanese Patent Laid-Open No. 2000-175159 discloses a technique that references not only motion information of a target field but also motion information in a field prior to the target field.

Japanese Patent Publication No. 8-32025 discloses a technique that adds, to motion information of a target field, a value that is obtained by multiplying an attenuation coefficient to motion information detected in a field prior to the target field. In accordance with that technique, the effect of the motion information detected as a moving picture persists across a plurality of fields.

There are some cases where the technique disclosed in Japanese Patent Laid-Open No. 2000-175159, in other words, simply referencing the motion information of the prior field is unable to overcome the drawback of the erroneous interpolation value.

In such cases, according to the study of the inventors of this invention, the storing of the motion information in the past field is effective, but the motion information of all pixels can be processed as being a moving picture if the past motion information is merely stored and used. In this respect, the technique disclosed in Japanese Patent Publication No. 8-32025 is found to be effective.

When input video is switched to a still picture, the motion information that is detected as a moving picture in a past field still has an effect even though the attenuation coefficient is multiplied. When an interpolation value must be calculated as a still picture in a given field, an interpolation component may be calculated as a moving picture instead. Replaying an precise image remains difficult until the interpolation component as the moving picture is substantially nullified.

SUMMARY OF THE INVENTION

A method of the present invention in one aspect processes motion information in an input interlace-scanned pixel signal, and includes the steps of detecting motion information of a target pixel based on difference information of a pixel signal at the same location between two fields, outputting the motion information of the target pixel by determining the motion information of the target pixel based on the detected motion information of the target pixel in the target field and the motion information of the target pixel in a past field prior to the target field, and determining whether moving pixels of at least a predetermined number are present within an area containing a plurality of adjacent pixels containing the target pixel in the target field, wherein the moving pixel has motion information indicating a moving picture, and wherein the motion information of the target pixel is determined in the outputting step with the motion information of the target pixel in the past field disregarded if the number of the moving pixels is not larger than the predetermined number.

An apparatus of the present invention in another aspect processes motion information in an input interlace-scanned pixel signal, and includes a detector for detecting motion information of a target pixel based on difference information of a pixel signal at the same location between two fields, an output unit for outputting the motion information of the target pixel by determining the motion information of the target pixel based on the detected motion information of the target pixel in the target field and the motion information of the target pixel in a past field prior to the target field, and a determiner for determining whether moving pixels of at least a predetermined number are present within an area containing a plurality of adjacent pixels containing the target pixel in the target field in the target field, wherein the moving pixel has motion information indicating a moving picture. The motion information of the target pixel is determined in the outputting step with the motion information of the target pixel in the past field disregarded if the number of the moving pixels is not larger than the predetermined number.

Further objects, features and advantages of the present invention will become apparent from the following description of the preferred embodiments with reference to the attached drawings.

BRIEF DESCRIPTION OF THE DRAWINGS

FIG. 3 is a block diagram illustrating an IP converter in accordance with the preferred embodiment of the present invention.

FIGS. 4A-4C diagrammatically illustrates interlace-scanned video information.

FIG. 5 is a block diagram illustrating the structure of an motion information processing apparatus in accordance with a first preferred embodiment of the present invention.

FIG. 9 is a block diagram illustrating the structure of a motion information processing apparatus as a comparative example.

FIG. 14 is a block diagram illustrating the structure of a motion information processing apparatus in accordance with a second preferred embodiment of the present invention.

FIG. 15 is a block diagram illustrating the structure of a motion information processing apparatus in accordance with a third preferred embodiment of the present invention.

DESCRIPTION OF THE PREFERRED EMBODIMENTS

The preferred embodiments of a motion information processing apparatuses of the present invention will now be discussed. The motion information processing apparatus replays a precise image with erroneous display controlled. The motion information processing apparatus of the present invention is free from the drawback that motion information of an interpolation pixel that must be processed as a moving picture is processed as a still picture when a moving picture is switched to a still picture. The motion information processing apparatus is quickly shifted to a still image interpolation process in a motion adaptive interlace-progressive (IP) conversion when a moving picture is switched to a still picture.

Figure 1A:
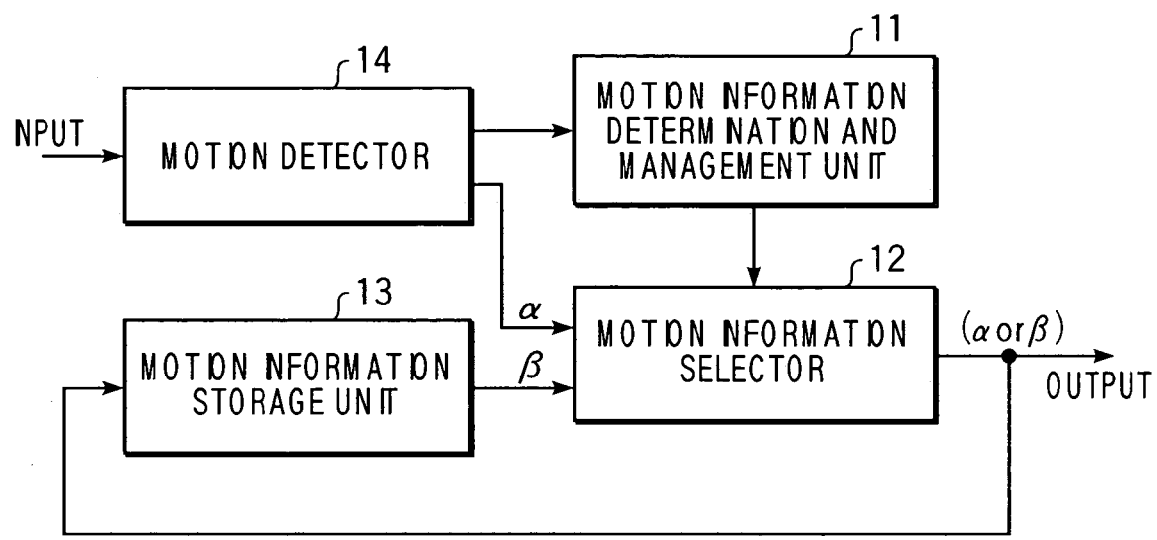
FIGS. 1A and 1B illustrates the structure of a motion information processing apparatus in accordance with one preferred embodiment of the present invention.
Figure 1B:
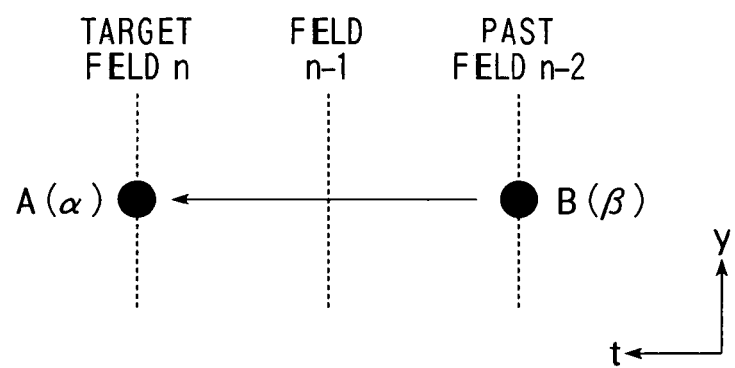
Figure 2:
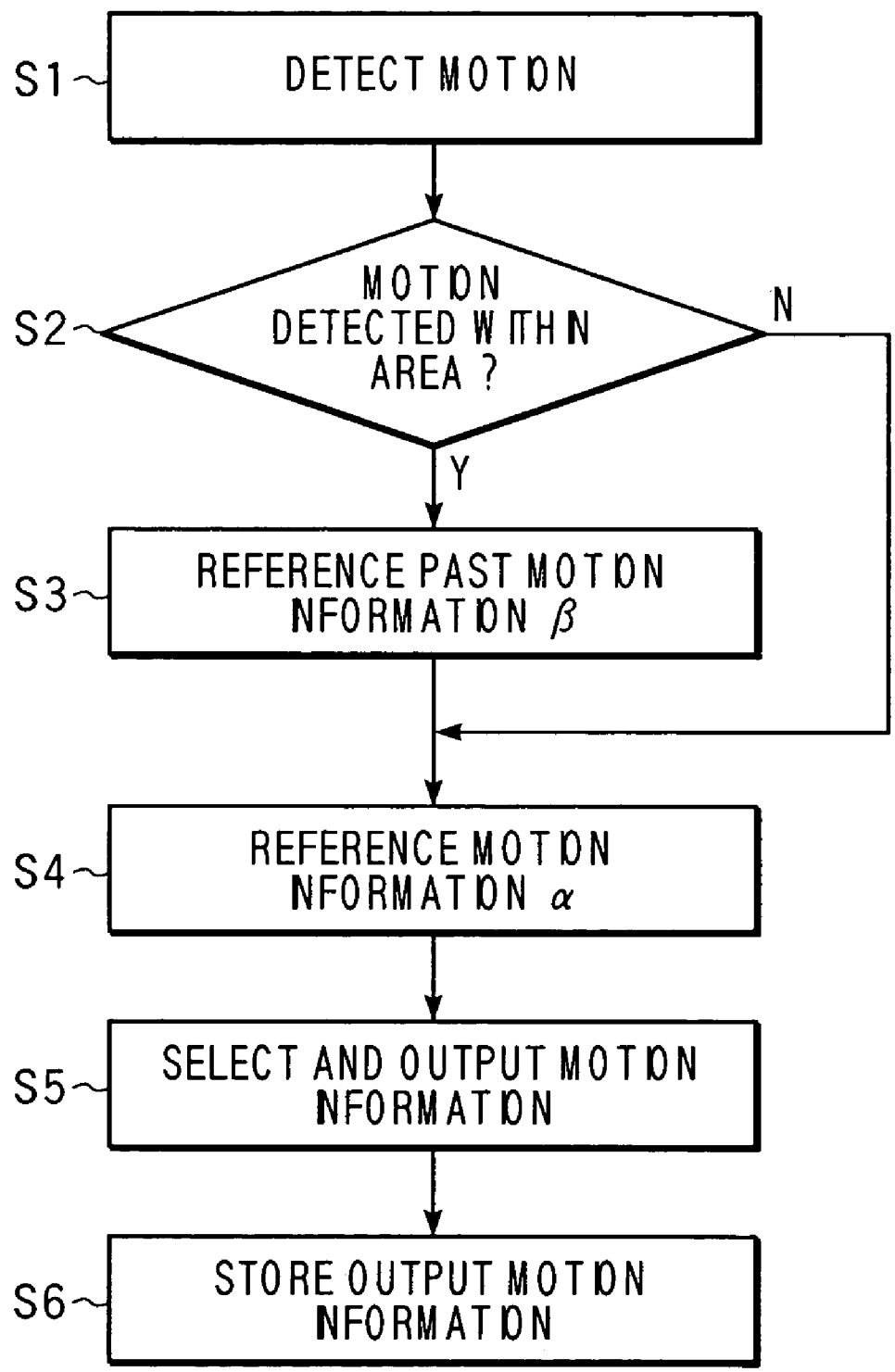
FIG. 2 is a flowchart illustrating the motion information processing method in accordance with the preferred embodiment of the present invention.

FIGS. 1A and 1B and FIG. 2 generally illustrate the motion information processing apparatus of one preferred embodiment of the present invention.

As shown in FIGS. 1A and 1B, the motion information processing apparatus processes motion information in an input interlace-scanned pixel signal.

A motion detector 14 for detecting motion information of a target pixel detects motion information a of a target pixel A based on difference information (A–B) of a pixel signal of pixels A and B at the same location in two fields.

The motion information selector 12 selects and outputs the motion information α or β of the target pixel A based on the motion information α of the target pixel A in a target field N, and motion information β of the target pixel B in a past field N–2 prior to the target field. A motion information determination and management unit 11 determines whether moving pixels, having motion information indicating a moving picture in the target field, larger in number than a predetermined number are present in an area (a pixel group) containing a plurality of adjacent pixels containing the target pixel A.

If the motion information determination and management unit 11 determines that the moving picture pixels are not present in number larger than the predetermined number within the area, a motion information selector 12 determines the motion information of the target pixel A as being α neglecting the motion information β of the target pixel B in the past field.

If the motion information determination and management unit 11 determines that the moving picture pixels are present in number larger than the predetermined number within the area, the motion information selector 12 determines the motion information of the target pixel A as α or β without neglecting the motion information β of the target pixel B in the past field.

The motion information selected by the motion information selector 12 is input to a motion information storage unit 13 for a subsequent process.

The area refers to a group containing all or part of pixels forming one field or one frame, and contains all or part of the pixels forming one horizontal line or one vertical line, or all or part of the pixels forming a plurality of adjacent horizontal lines or a plurality of adjacent vertical lines. More specifically, the area may refer to a group of all effective pixels along one horizontal scanning line, a group of all effective pixels along a plurality of adjacent horizontal scanning lines, a group of all effective pixels along one vertical column, a group of all effective pixels along a plurality of adjacent vertical columns, or a group of adjacent pixels in a two-dimensional area of several rows by several columns such as 16 pixels by 16 pixels. Preferably, a group of one horizontal canning line or a plurality of horizontal scanning lines is managed.

In the determination of whether the area is a moving picture or a still picture, the area is preferably determined as a moving picture if at least one pixel is determined as a moving picture pixel. Optionally, two pixels, three pixels or more pixels may be used as a threshold to determine whether the area is a moving picture or a still picture.

The motion information output from the motion information selector 12 is fed back to the motion information selector 12 as the motion information as the past field and is thus referenced in a next motion information determination. In response to the motion information of the area determined in the motion information determination and management unit 11, the motion information selector 12 determines whether to reference the past motion information fed back. The drawback of the known art is thus overcome.

FIG. 2 is a flowchart illustrating a motion information detection method in accordance with one preferred embodiment of the present invention.

In step S1, the motion detector 14 detects the motion information of a target pixel in a target field based on the difference information of the pixel signal at the same location on two fields.

In step S2, it is determined that moving pixels of a predetermined number or larger are present in the aforementioned area within the target field.

If it is determined that a group of pixels is a moving picture, the motion information processing apparatus references the determined and held motion information β of the target pixel in the past field prior to the target field in step S3. In step S4, the motion information processing apparatus references the detected motion information α of the target pixel in the target field.

When it is determined moving pixels of the predetermined number, or more are not present in the pixel group, step S3 is skipped. The apparatus thus references the detected motion information of the target pixel α with the motion information β of the target pixel in the past field neglected.

In step S5, the motion information processing apparatus determines and outputs the motion information of the target pixel in the target field based on the referenced motion information.

If the area containing the target pixel and the surrounding pixels thereof is determined as a moving picture, the motion information is determined at least by referencing the past motion information although there are times when the past motion information is not directly accounted for. If the area is determined as a still picture, the motion information is determined by referencing the target pixel of the target field without referencing the past motion information.

The motion information determined in step S5 is stored in a memory in preparation for a next information processing operation. The motion information stored is referenced in the next information processing operation, and this series of steps is repeated.

The flow of steps S3 and S4 is not limited to this process. As long as the flow achieves the same purpose, any equivalent steps are acceptable.

In the IP conversion, the motion information of an interpolation pixel to be interpolated may be the motion information of a pixel resulting from the above-referenced motion information processing method. Now considered are a pair of pixels, at the same location as the location of the interpolation pixel, in a field prior to the field of the interpolation pixel and a field subsequent to the field of the interpolation pixel, and a pair of pixels prior to and subsequent to the interpolation pixel in the same field. At least the motion information of at least one of the pairs of pixels is preferably referenced in calculation. For example, to account for a picture in the same field, the motion information of the interpolation pixel is preferably provided based on the motion information ($\epsilon$, α) of at least two pixels (E, A) in adjacent locations in the same field as the interpolation pixel X. In response to the motion information of the interpolation pixel, a motion adaptive IP conversion is performed to calculate the interpolation value of the interpolation pixel (pixel signal value).

Preferably, a motion adaptive IP converter determines motion information χ of the interpolation pixel X, based on the motion information ($\epsilon$, β) of the two pixels (A, B) at the same location as the interpolation pixel X in the prior field and the subsequent field, and the motion information (γ, δ) of the two pixels (C, D) in adjacent locations in the same field as the field of the interpolation pixel X. The interpolation value of the interpolation pixel X is thus calculated.

FIG. 3 is a block diagram of the motion adaptive IP converter.

Interlace-scanned video signal (pixel signal) is successively stored in field signal storage units 1 and 2 on a field-by-field basis. A motion information generator 3 detects a difference between the video signal of a field currently being input and the video signal of a field that is input one frame (two fields) before the current field from the field signal storage unit 2. The motion information generator 3 thus determines whether the video signal is moving picture information or still picture information on a pixel-by-pixel basis, and determines the motion of the interpolation pixel based on the pixel-by-pixel motion information. The motion information processing apparatus is preferably applied in the motion information generator 3.

The video signal output from a line signal storage unit 4 for storing the input video signal on a per line basis and the input video signal are added by an adder 7, and the resulting sum is halved by a multiplier 8. In response to the motion information from the motion information generator 3, the interpolation signal selector 9 selects for the interpolation pixel value between the video signal input one field before the currently input field from the field signal storage unit 1 and the average of the pixel value at the upper and lower lines with respect to the interpolation pixel output from the multiplier 8. Input and output rate converters 5 and 6 respectively store the video signal of the interpolation pixel output from the interpolation signal selector 9 and the input video signal on a per line basis, and then read the stored video signal at a rate twice as fast as the rate of the input video signal. The display signal selector 10 alternates between the outputs from the input and output rate converters 5 and 6 every line and then outputs the selected signal.

The signal storage units and motion information storage units used in the present invention may be constructed of a delay circuit.

FIG. 4 illustrates an image that is presented in interlace scan in response to a national television system committee (NTSC) signal. One frame of the NTSC signal, containing 525 horizontal lines, is divided into an odd field presenting odd lines, and an even field presenting even lines. With the odd field alternating with the even field, the NTSC signal presents video information of 525 lines. In other words, the odd field and the even field complement each other in line information.

The video signal of the pixel in the prior field corresponding to the location of the pixel to be interpolated is obtained from the field signal storage unit 1 of FIG. 3, and is treated as an interpolation value in a still picture. The video signal of adjacent pixels in upper and lower lines with respect to the pixel to be interpolated is obtained from the input video signal and the output from the line signal storage unit 4. The average of the video signals of the two adjacent pixels is determined by the adder 7 and the multiplier 8. This is treated as an interpolation value in a moving picture.

When the motion information χ of the interpolation pixel is a moving picture, the value of the pixel signal of the interpolation pixel is preferably determined from the pixel signal of two reference pixels in adjacent locations in the same field as the field of the interpolation pixel. When the motion information χ of the interpolation pixel is a still picture, the value of the pixel signal of the interpolation pixel is preferably determined from at least one of pixel signals of two reference pixels, at the same location as the interpolation pixel, in the prior field and the subsequent field.

In response to the input interlace-scanned pixel signal, the motion information processing apparatus determines the motion information of the interpolation pixel, and the motion adaptive IP converter interpolates between lines in each field for lack of line to provide a video signal in progressive scan. A display device selects the scanning line in a progressive mode, thereby replaying the video signal.

The preferred embodiments of the present invention will now be specifically discussed with reference to the drawings.

First Preferred Embodiment

FIG. 5 is a block diagram of a motion information processing apparatus in accordance with one preferred embodiment of the present invention. This apparatus is appropriate for use as the motion information generator 3 in the motion adaptive IP converter of FIG. 3.

As shown, the previously discussed motion detector 14 includes a subtractor 31, an absolute value circuit 32, a threshold value filter circuit 33. The detected motion information is transferred to a motion information selector 39 through a line motion information storage circuit 41. The motion information selector 39 and an OR gate 38 perform the function of the motion information selector 12. A motion information management unit 40 corresponds to the motion information determination and management unit 11, and each of field motion information storage circuits 36 and 37 correspond to the motion information storage unit 13.

On a per line basis, a line motion information storage unit 34 stores pixel-by-pixel motion information output from the motion information selector 39 to be discussed later. An interpolation pixel motion information generator 35 determines and outputs motion information of the interpolation pixel generated between lines, based on motion information output from the motion information selector 39 and motion information at a pixel in a line one line before, output from the line motion information storage unit 34. The interpolation pixel motion information generator 35 may include an OR gate having two input terminals, for example.

The line motion information storage circuit 41 stores, on a per line basis, pixel-by-pixel motion information output from the threshold value filter circuit 33. A motion information management unit 40 manages the pixel-by-pixel motion information output from the threshold value filter circuit 33 on a per unit area basis, wherein the unit area is formed of a plurality of adjacent pixels. The motion information selector 39 selects between motion information output from the line motion information storage circuit 41 and motion information output from the OR gate 38 and outputs the selected motion information in accordance with the motion information managed on a per unit area basis and output by the motion information management unit 40. The field motion information storage circuits 36 and 37 store the input motion information on a per field basis. During one field period, the field motion information storage circuit 36 stores the motion information output from the motion information selector 39. During one field period, the field motion information storage circuit 37 stores the motion information output from the field motion information storage circuit 36. In this arrangement, the field motion information storage circuit 36 outputs motion information delayed by one field period from the motion information output from the motion information selector 39. The field motion information storage circuit 37 outputs motion information delayed by one field period from the motion information output from the field motion information storage circuit 36, namely, outputs motion information delayed by two field periods from the motion information output from the motion information selector 39. The OR gate 380R gates motion information output from the line motion information storage circuit 41 and the motion information output from the field motion information storage circuit 37, and outputs the OR gated signal to the motion information selector 39.

The motion information of the interpolation pixel output from the interpolation pixel motion information generator 35 is supplied to the interpolation signal selector 9 in the motion adaptive IP converter. The interpolation signal selector 9 selects the interpolation signal.

The operation of the motion information generator 3 of the first preferred embodiment of the present invention will now be discussed.

The subtractor 31 determines a difference between the video signal of the currently input field and the video signal of the field input one frame before the currently input field from the field signal storage unit 2.

The absolute value circuit 32 determines the absolute value of the difference calculated by the subtractor 31, and supplies the threshold value filter circuit 33 with the absolute value of the difference.

The threshold value filter circuit 33 compares the absolute value with a preset threshold value. If the absolute value is smaller than the threshold value, the threshold value filter circuit 33 determines the video signal of the pixel as a still picture, thereby outputting "0". If the absolute value is greater than the threshold value, the threshold value filter circuit 33 determines the video signal of the pixel as a moving picture, thereby outputting "1". Even if unwanted signal such as noise is superimposed on the input video signal, the effect of the unwanted signal may be eliminated as long as the unwanted signal is within a limited range.

The pixel-by-pixel motion information output from the threshold value filter circuit 33 is stored on a line-by-line basis in the line motion information storage circuit 41. The motion information of the pixel one line before the currently input video signal is thus output from the line motion information storage circuit 41.

Figure 6:
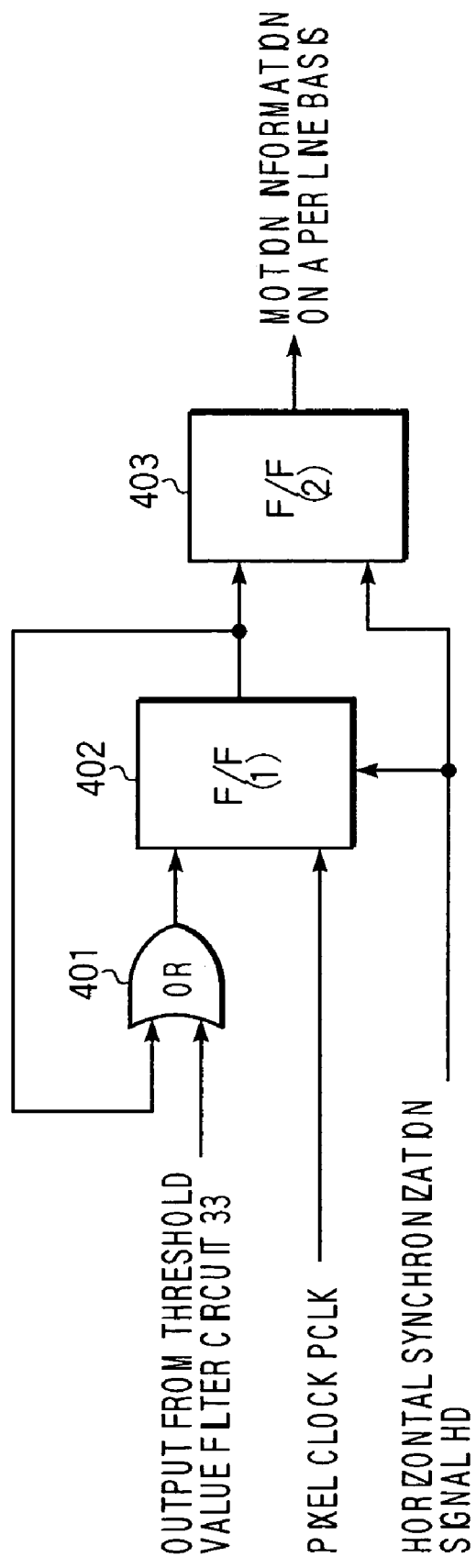
FIG. 6 is a block diagram illustrating the structure of a motion information management unit used in the present invention.

FIG. 6 is a block diagram illustrating the motion information management unit 40 for use in the present invention. Here, the pixel-by-pixel motion information output from the threshold value filter circuit 33 is managed on a line-by-line basis (on a per unit area basis).

As shown in FIG. 6, an OR gate 401 OR gates two signals input thereto. Flipflops 402 and 403 hold the state of the signals input thereto. The OR gate 401 OR gates the pixel-by-pixel motion information output from the threshold value filter circuit 33 and the output signal from the flipflop 402, and outputs the OR gated signal to the flipflop 402. The flipflop 402 holds the output from the OR gate 401 in synchronization with a pixel clock signal PCLK that varies at the timing of the input pixel. More specifically, once "1" is output from the threshold value filter circuit 33, the flipflop 402 continuously holds and outputs "1". The state held in the flipflop 402 is initialized at a horizontal synchronization signal HD output at the start of each horizontal line. The state immediately prior to the initialization is stored in the flipflop 403. More specifically, the flipflop 403 outputs a signal indicating whether a pixel as a moving picture is present in a line prior to the currently input video signal. If information is managed by a unit equal to half the line, a clock having a frequency twice the horizontal synchronization signal HD may be used. Such a clock may be phase locked with the horizontal synchronization signal HD using a synchronization signal generator such as phase lock loop.

Figure 7:
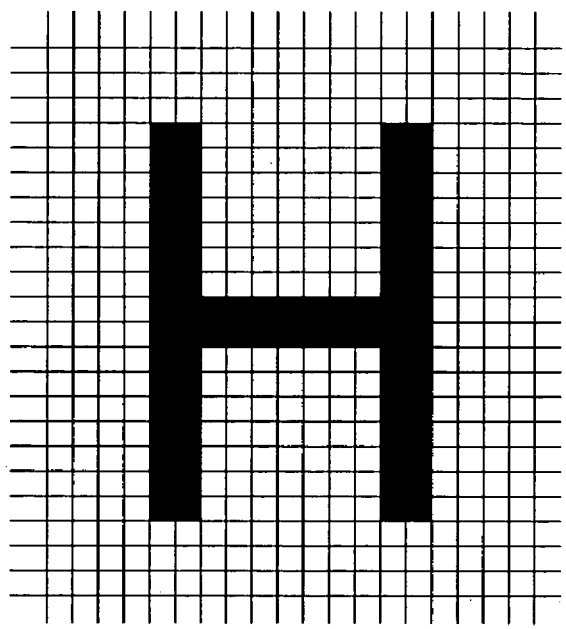
FIG. 7 diagrammatically illustrates the operation of the motion information management unit.

FIG. 7 illustrates the pixel-by-pixel motion information that is managed on a per line basis by the motion information management unit 40. As shown, the motion information of pixels arranged in the letter "H" is detected as being a moving picture. The motion information management unit 40 outputs "1" for a line having a pixel from which motion information as a moving picture corresponding to the letter H is detected, and outputs "0" for the remaining lines.

Figure 8:
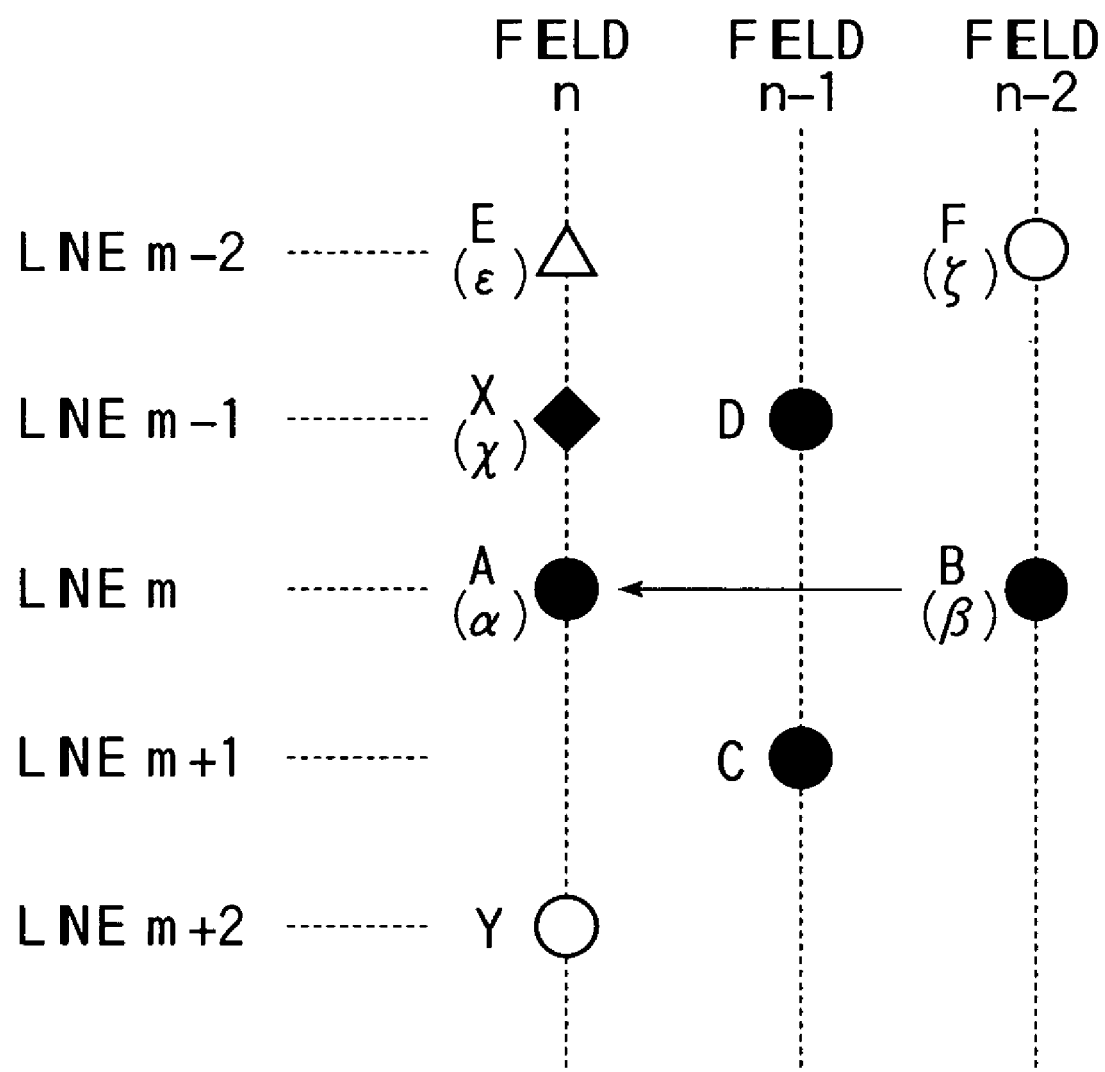
FIG. 8 diagrammatically illustrates the relationship between a pixel and the motion information of the pixel.

FIG. 8 diagrammatically illustrates related pixels in adjacent five lines in three consecutive fields and the motion information of the pixels.

Here, A-F, X and Y represent pixels. In the first preferred embodiment, pixels A and B are reference pixels referenced to determine the motion information of the pixel A, and Y is a currently input pixel. Pixels A and E serve as reference pixels for determining the motion information of the interpolation pixel X. The motion information of pixel E is determined by referencing motion information ζ of the pixel F in the same way as the motion information of the pixel A is determined.

If the interpolation pixel X is determined as being a moving pixel, the average of the video signal values of the pixel A and the pixel E becomes a video signal value of the interpolation pixel X. If the interpolation pixel X is determined as being a still pixel, the video signal value of the pixel D becomes a video signal value of the interpolation pixel X.

Referring to FIG. 5, the motion information management unit 40 outputs the state of the line one line before the video signal of the currently input pixel Y. The motion information selector 39 receives, at one input terminal thereof, through the line motion information storage circuit 41, the motion information α that is delayed by one line from the motion information of each pixel output from the threshold value filter circuit 33. Furthermore, the motion information selector 39 receives the motion information output from the OR gate 38. The motion information selector 39 selects and outputs these pieces of motion information in accordance with the motion information managed and output on a unit area basis by the motion information management unit 40. More specifically, if the motion information management unit 40 outputs "0", the motion information of the line motion information storage circuit 41 is selected. If the motion information management unit 40 outputs "1", the motion information of the OR gate 38 is selected. The motion information selector 39 then outputs the selected motion information.

The motion information output from the motion information selector 39 is input to the field motion information storage circuit 37 through the field motion information storage circuit 36, and is output from the field motion information storage circuit 37 as the motion information β of the pixel B in the field one frame period earlier than the motion information output from the motion information selector 39. The OR gate 380R gates the pixel-by-pixel motion information output from the threshold value filter circuit 33 and the motion information in the field one frame before, output from the field motion information storage circuit 37. If a moving picture is detected in the currently input motion information α or the motion information β in the field one frame before, the OR gate 38 outputs the motion information in the pixel as a moving picture.

If it is determined that a moving picture is present in the same line as the pixel processed in the motion information management unit 40, the motion information selector 39 selects and outputs the motion information output from the OR gate 38, namely, the motion information determined from the motion information α resulting from inter-frame difference information and the motion information β in the field one frame before. If it is determined that no moving picture is present in the same line, the motion information selector 39 selects and outputs the motion information output from the line motion information storage circuit 41, namely, the motion information α resulting from the inter-frame difference information. If moving pixels are continuously detected in the area managed by the motion information management unit 40, the motion information as a moving picture in the past fields persist across a plurality of frames. If no moving pixels are detected in the area managed by the motion information management unit 40, in other words, all pixels on the line is still pixels, the motion information in the past frames is immediately neglected. The motion information α obtained from the inter-frame difference information in the current field is output.

The motion information output from the motion information selector 39 is also input to the line motion information storage unit 34 and the interpolation pixel motion information generator 35. The line motion information storage unit 34 outputs the motion information (ε or ζ) of the pixel E that is one line delayed and output from the line motion information storage unit 34. The interpolation pixel motion information generator 35 receives the motion information (α or β) output from the motion information selector 39 and the motion information (ε or ζ) of the pixel one line before output from the line motion information storage unit 34, and determines the motion information of the interpolation pixel present between lines.

The advantages of the first preferred embodiment of the present invention will now discussed in comparison with a reference example.

FIG. 9 is a block diagram of the motion information processing apparatus as the reference example.

As shown, an interpolation pixel motion information generator 35 receives the motion information output from the threshold value filter circuit 33, and the motion information at the pixel one line before output from the line motion information storage unit 34, and produces the motion information at an interpolation pixel newly generated between these lines.

The motion information of the apparatus will now be discussed with reference to FIGS. 10A through 12D.

In the IP conversion discussed with reference to FIG. 3, the interpolation signal selector 9 selects and outputs the video signal of the pixel output from the field signal storage unit 1 if the motion information output from the motion information generator 3 is "0". The interpolation signal selector 9 selects and outputs the video signal of the pixel output from the multiplier 8 if the motion information output from the motion information generator 3 is "1".

Since the inter-frame difference information is used in the detection of the motion information, a moving picture may be mistaken for a still picture if a motion occurs in a given field between frames. The motion in the field between the frames is detected by referencing the motion information in the prior field or the subsequent field. An erroneous detection may still take place in the video shown in FIGS. 10A-10D. As shown, the letter "H" successively horizontally shifts at regular intervals from right to left.

Figure 10A:
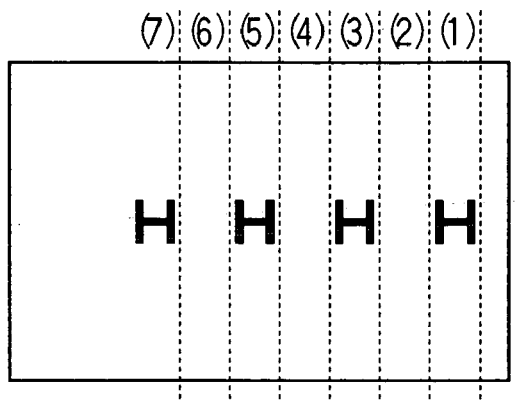
FIGS. 10A-10D diagrammatically illustrate interlace-scanned video information.
Figure 10B:
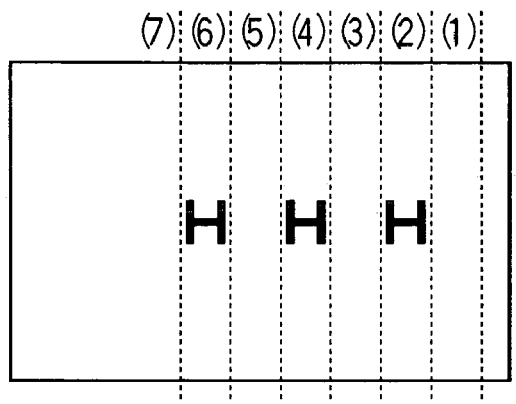
Figure 10C:
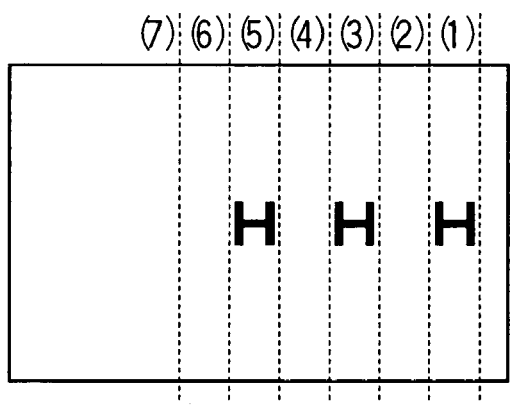
Figure 10D:
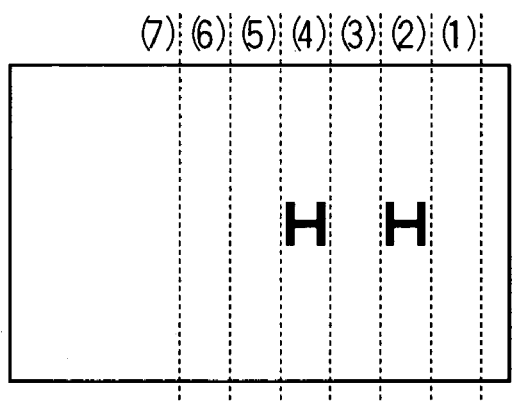

FIG. 10A illustrates a display state in a current field n, FIG. 10B illustrates a display state in a field one field before the current field, FIG. 10C illustrates a display state in a field two fields before the current field, and FIG. 10D illustrates a display state in a field three fields before the current field.

If the motion information is determined from the interframe difference information, the motion information of the pixels in the field n is determined by comparing the display state of FIG. 10A and the display state of FIG. 10C.

Figure 11A:
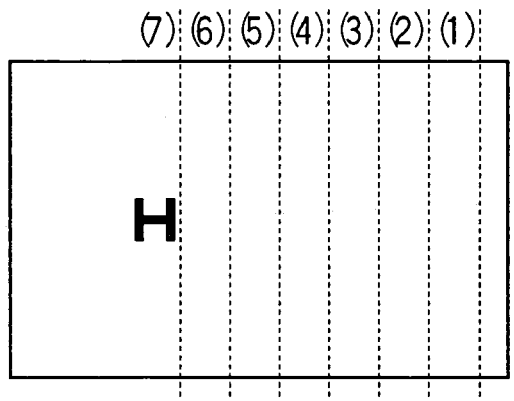
FIGS. 11A-11D diagrammatically illustrate motion information by the comparative example derived from the video information of FIGS. 10A-10D.
Figure 11B:
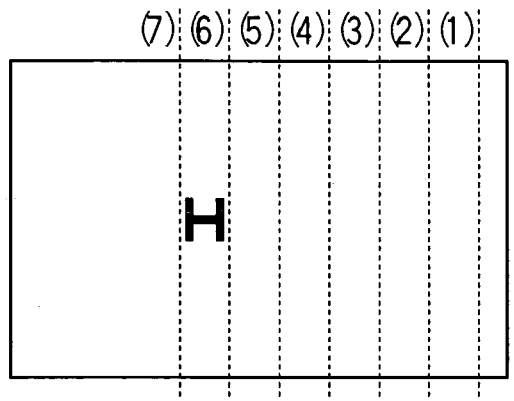
Figure 11C:
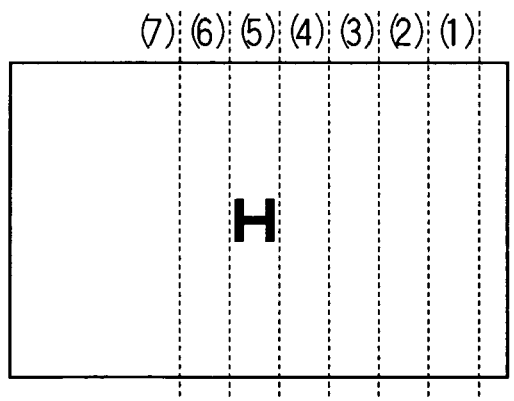
Figure 11D:
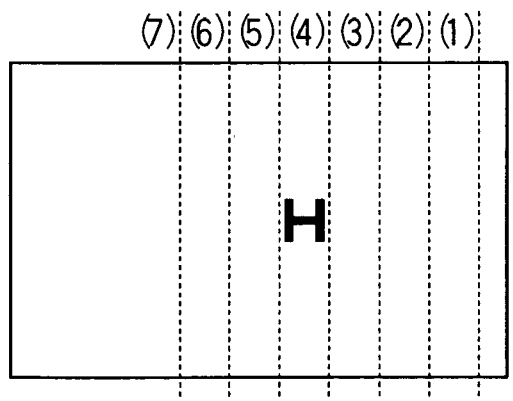
Figure 12A:
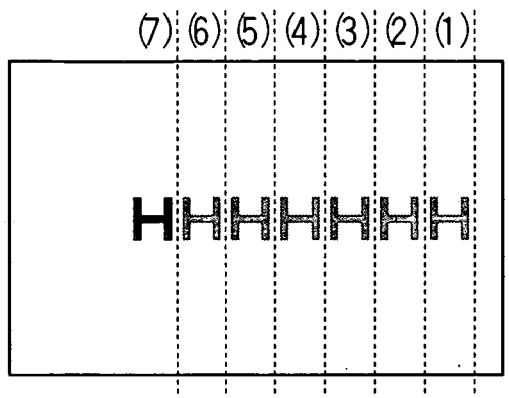
FIGS. 12A-12D diagrammatically illustrate video information, IP converted from the motion information of FIGS. 11A-11D, and replayed and displayed in progressive scanning.
Figure 12B:
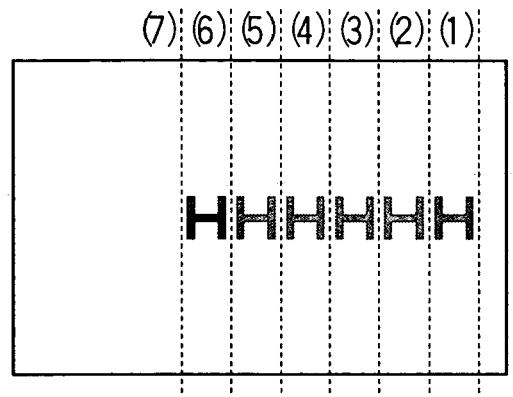
Figure 12C:
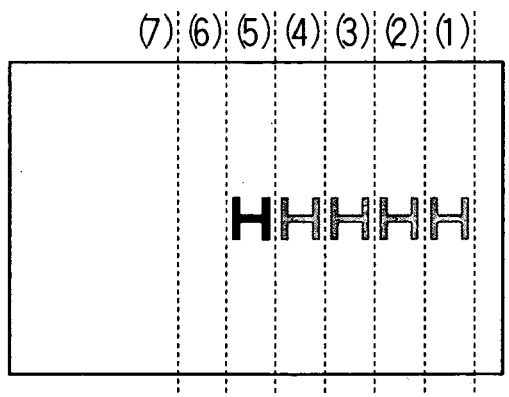
Figure 12D:
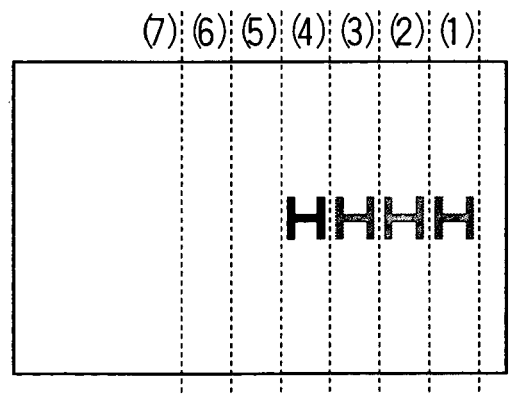
Figure 13A:
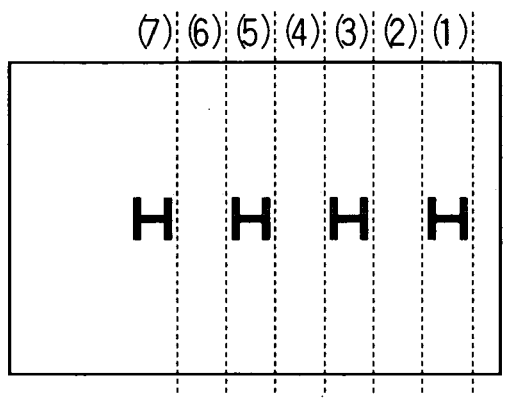
FIGS. 13A-13D diagrammatically illustrate motion information of one preferred embodiment of the present invention, obtained from the video information of FIGS. 10A-10D.
Figure 13B:
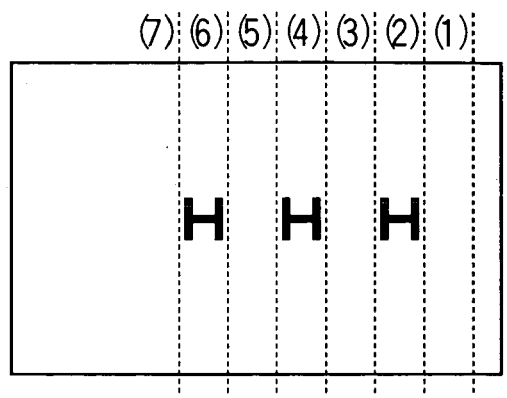
Figure 13C:
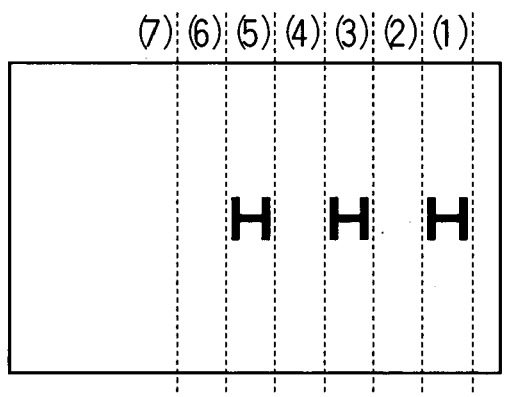
Figure 13D:
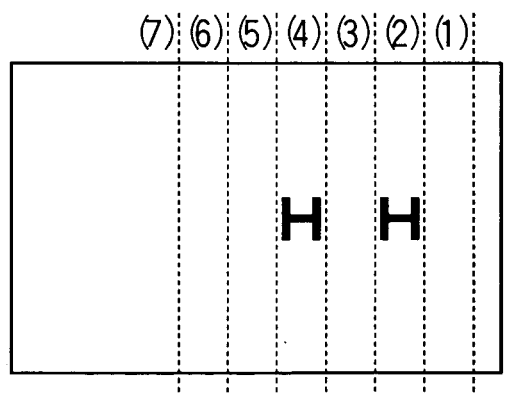

As shown in FIG. 11A, only the letter H at the left end shown in FIG. 10A is determined as a moving picture. The motion information of the pixels in the field (n−1) through field (n−3) are similarly determined. The state of the letter H at the left end is determined as the motion information as shown in FIGS. 11B, 11C, and 11D. The display state shown in FIG. 10A should be displayed in the current field n. However, only the letter H positioned at the left end is determined as the moving picture and selected in the intra-field interpolation to be displayed. In the remaining area, the inter-field interpolation is selected, and a mix of the display state of FIG. 10A and the display state of FIG. 10B is displayed.

In accordance with the first preferred embodiment of the present invention, the motion information of each field output from the motion information selector 39 is determined as the motion information of FIGS. 13A-13D in response to the input video information of FIGS. 10A-10D.

As long as the letter H is moving, the motion information as the moving picture in the past frames persists across a plurality of frames. In comparison with the motion information of FIGS. 11A-11D, more precise motion information is detected.

When the motion information of the past field is stored, the effect of the motion information of the past fields continuously persists, and the motion information in all pixels is finally processed as a moving picture.

In accordance with the first preferred embodiment of the present invention, the pixels moving in the area preset by the motion information management unit 40 are not detected at all, and if the pixels within the area are determined as being still, the motion information of the target pixel in the target field is considered as being on its own. The effect of the motion information of the past field is cut off, and motion information indicating a still picture is thus obtained. In other words, interpolation pixel value is immediately generated as a still picture at the moment a moving picture is switched to a still picture.

This arrangement eliminates the need for managing the motion information accounting for a past motion using a plurality bits.

The motion information management unit 40 of FIG. 5 manages the pixel-by-pixel motion information, output from the threshold value filter circuit 33, on a per line basis. A plurality of line motion information storage units may be arranged to store the pixel-by-pixel motion information output from the threshold value filter circuit 33 on a per line basis. In this arrangement, the motion information may be managed in a plurality of lines.

In accordance with the first preferred embodiment of the present invention, the motion information of the target pixel in the target field is generated from the difference information between the video signal of the target pixel and the pixel at the same location in the field one frame delayed if a moving pixel is detected from within the area (the pixel group) preset in the motion information management unit 40. The motion information is determined by referencing the motion information of the target pixel and the motion information of the target pixel similarly determined in the past field.

The motion information of the target pixel is held throughout one frame. When the motion information of the target pixel is determined again, the motion information is also used. In this way, the motion information of the past field is held across the plurality of field periods.

If no moving pixel is detected in the area preset by the motion information management unit 40, the motion information of the target pixel depends on the difference information between the video signal of the target field and the video signal of the field delayed one frame from the target field. This arrangement cuts off the effect of the motion information of the past field, and the motion information indicating the still picture is thus obtained. In other words, an interpolation pixel value is immediately generated as a still picture at the moment a moving picture is switched to a still picture.

The first preferred embodiment of the present invention manages the motion information of the input pixel, accounting for the motion information of the past field, with one bit.

Second Preferred Embodiment

FIG. 14 is a block diagram of a motion information processing apparatus in accordance with a second preferred embodiment of the present invention. The motion information processing apparatus is appropriately used as the motion adaptive IP converter of FIG. 3.

In comparison with the motion information generator 3 of FIG. 5, the motion information processing apparatus of FIG. 14 includes a line motion information storage unit 42 for holding the motion information output from the line motion information storage circuit 41 for another one line period. In addition to the motion information output from the threshold value filter circuit 33, the motion information management unit 40 receives the motion information output from the line motion information storage circuit 41, and the motion information output from the line motion information storage unit 42. The motion information management unit 40 determines the motion information within the preset area (a pixel group along three adjacent lines) from the motion information of the adjacent three lines.

In accordance with the second preferred embodiment of the present invention, the number of pixels to be referenced along the line is not limited to all pixels along one line. Alternatively, the number of flipflops for holding the pixel-by-pixel motion information output from the threshold value filter circuit 33 in the motion information management unit 40 of FIG. 6 may be set to be the number of pixels to be referenced, and the limited pixels only may be referenced. The area managed by the motion information management unit 40 is not limited to the one described in each of the preferred embodiments.

If a pixel having a moving picture is not detected in the area managed by the motion information management unit 40, the motion information obtained from the inter-frame difference information is used as is. If a pixel having a moving picture is detected in the area managed by the motion information management unit 40, the pixel-by-pixel motion information is determined by referencing the motion information of the past field one frame before, in addition to the motion information obtained from the inter-frame difference information.

The pixel-by-pixel motion information is thus stored in the field motion information storage circuit 36 and the field motion information storage circuit 37 during one frame period. When a pixel determined to be a moving image in the area managed by the motion information management unit 40 is detected, the motion information output from the field motion information storage circuit 37 is used as the motion information in the past field one frame before. The target pixel determined to be a moving image within the area managed by the motion information management unit 40 may be detected across a plurality of frames. If the motion information of the pixel is determined as a moving picture at least once during that period, the motion information of the pixel is output as a moving picture during a period throughout which the pixel determined to be a moving picture within the area managed by the motion information management unit 40 is detected.

More specifically, in response to the input video signal of FIGS. 10A-10D, the motion information of each field output from the motion information selector 39 is determined as illustrated in FIGS. 13A-13D. As long as the letter H is shifting, the motion information as the moving picture in the past frame persists over a plurality of frame periods. More precise motion information thus results than the motion information of FIGS. 11A-11D.

If the area preset by the motion information management unit 40 is determined as being a still picture, the effect of the motion information of the past field is cut off, and the motion information indicating a still picture is thus obtained. In other words, an interpolation pixel value is immediately generated as a still picture at the moment a moving picture is switched to a still picture.

Third Preferred Embodiment

FIG. 15 is a block diagram of a motion information processing apparatus in accordance with a third preferred embodiment of the present invention. The motion information processing apparatus is appropriately used as the motion information generator 3 in the IP converter of FIG. 3.

The first and second preferred embodiments of the present invention does not detect motion in a field between frames. To detect the motion, a prior field and a subsequent field must be referenced in addition to the motion information in the current field. The motion information in the adjacent fields is thus accounted for. The motion information to be referenced here is not motion information obtained from mere inter-frame difference information. To obtain the motion information shown in FIGS. 13A-13D, the third preferred embodiment of the present invention uses the motion information output from the field motion information storage circuits 36 and 37. The field motion information storage circuits 36 and 37 are used to store the motion information output from the motion information selector 39. As previously discussed, the motion information output from the field motion information storage circuits 36 and 37 is field-by-field motion information output from the motion information selector 39 as shown in FIGS. 13A-13D, and therefore accounts for the motion information as a moving picture obtained in the past frame.

The apparatus of FIG. 15 accounts for the motion information in a prior field by referencing the motion information of prior and subsequent fields, based on the motion information output from the field motion information storage circuits 36 and 37.

The difference between the motion information processing apparatus of FIG. 15 and the motion information generator 3 of FIG. 5 is that the line motion information storage unit 34 receives the motion information output from the field motion information storage circuit 36, and that the interpolation pixel motion information generator 35 receives the motion information output from the motion information selector 39, the motion information output from the line motion information storage unit 34, the motion information output from the field motion information storage circuit 36 and the motion information output from the field motion information storage circuit 37. The interpolation pixel motion information generator 35 thus determines the motion information of the interpolation pixel from the motion information of these pixels. For this reason, the interpolation pixel motion information generator 35 employs a combination of an AND gate and an OR gate, rather than a simple OR gate. More specifically, the interpolation pixel motion information generator 35 receives the outputs from the field motion information storage circuit 37 and the motion information selector 39 at a two-input AND gate thereof, receives the output of the two-input AND gate, and the outputs from the field motion information storage circuit 36 and the line motion information storage unit 34 at a three-input OR gate thereof, and outputs the output from the OR gate as the output thereof.

Figure 16:
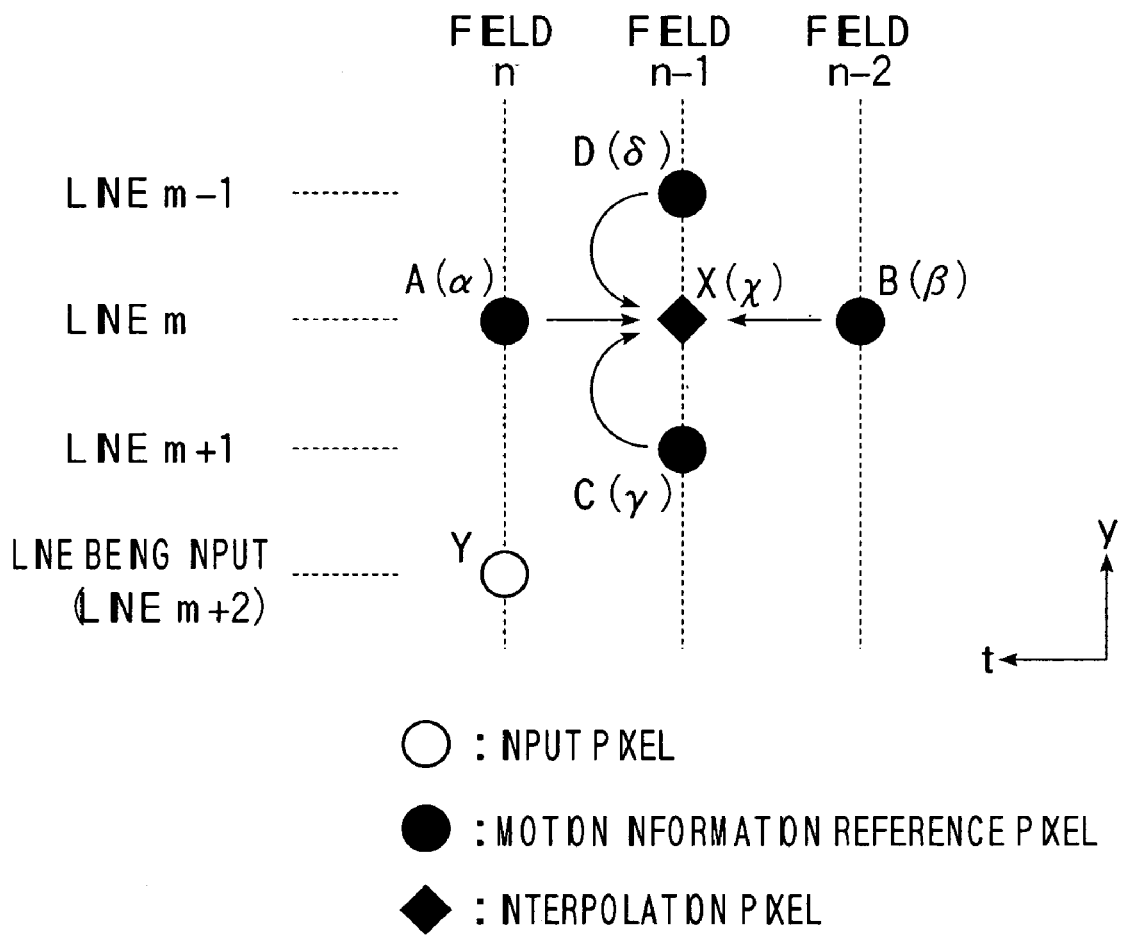
FIG. 16 diagrammatically illustrates the relationship between a pixel and the motion information of the pixel.
Figure 17A:
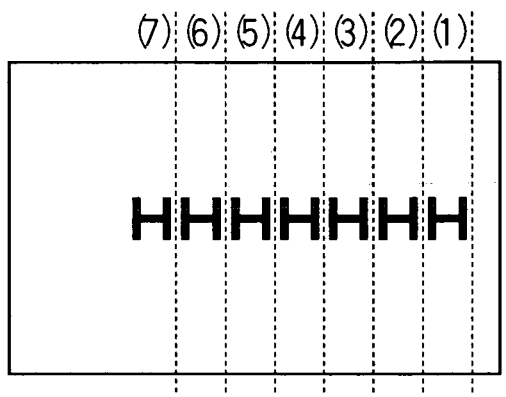
FIGS. 17A-17D diagrammatically illustrate the motion information of the third preferred embodiment of the present invention, derived from the video information of FIGS. 10A-10D.
Figure 17B:
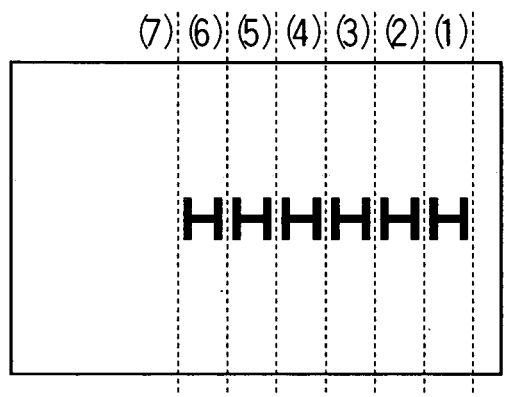
Figure 17C:
Figure 17D:
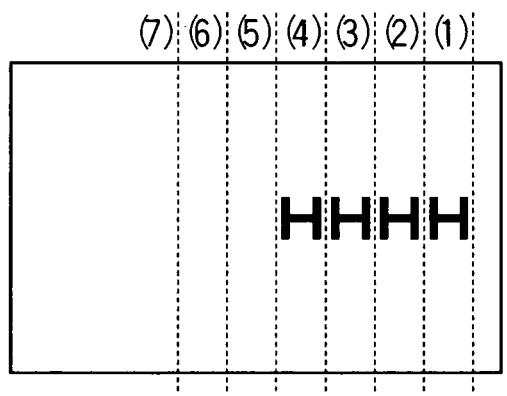

FIG. 16 illustrates how the interpolation pixel motion information generator 35 determines the motion information of the interpolation pixel X.

The motion information $\chi$ of the interpolation pixel X in a field (n−1) input one field period before the video signal of the pixel Y of the currently input field n is determined. The motion information $\gamma$ of a pixel C and the motion information $\delta$ of a pixel D in the field (n−1) are output from the field motion information storage circuit 36. The motion information $\alpha$ of a pixel A in a field n prior to the field (n−1) and the motion information $\beta$ of a pixel B in a field (n−2) subsequent to the field (n−1) are output from the field motion information storage circuit 36 and the motion information selector 39, respectively. If the video signal of the currently input pixel is the video signal of the pixel Y in a line (m+2), the motion information output from the line motion information storage circuit 41 is the motion information $\alpha$ of the pixel A at a line "m" because of one-line interlacing. The motion information output from the field motion information storage circuit 37 is the motion information $\beta$ of the pixel B that is delayed by two fields from the currently input pixel. The motion information selector 39 outputs the motion information of the pixel at line m, determined based on the motion information $\alpha$ of the pixel A at the line m in the field n output from the line motion information storage circuit 41 and the motion information $\beta$ of the pixel B at the line m in the field (n−2) output from the field motion information storage circuit 37.

The motion information output from the motion information selector 39, already delayed by the field motion information storage circuit 36 by one field period, is further delayed by the field motion information storage circuit 37 by another one field period. In other words, the field motion information storage circuit 36 outputs the motion information in the field (n−1), and the field motion information storage circuit 37 outputs the motion information in the field (n−2). If the field motion information storage circuit 36 outputs now the motion information $\gamma$ of the pixel C at the line (m+1) in the field (n−1), the line motion information storage unit 34 outputs the motion information of the pixel that is delayed by one line period from the motion information $\gamma$ output from the field motion information storage circuit 36, namely, outputs the motion information $\delta$ of the pixel D at the line (m−1) in the field (n−1).

The interpolation pixel motion information generator 35 receives the motion information α at the pixel A output from the motion information selector 39, the motion information β at the pixel B output from the field motion information storage circuit 37, the motion information γ at the pixel C output from the field motion information storage circuit 36, and the motion information δ at the pixel D output from the line motion information storage unit 34. Based on these pieces of information, the interpolation pixel motion information generator 35 thus determines the motion information χ at the interpolation pixel X at the line m in the field (n−1).

The motion information χ of the interpolation pixel X output from the interpolation pixel motion information generator 35 accounts for the motion information β in the prior field. As a result, the motion information shown in FIGS. 17A-17D is obtained in response to the video illustrated in FIGS. 10A-10D. The original state as shown in FIGS. 10A-10D is obtained with erroneous displays shown in FIGS. 12A-12D avoided.

In accordance with the third preferred embodiment of the present invention, the motion information χ of the interpolation pixel X is provided based on the motion information α and β of the target pixels output with respect to the pixels A and B at the same location in the adjacent fields different from the filed of the interpolation pixel X.

Fourth Preferred Embodiment

Figure 18:
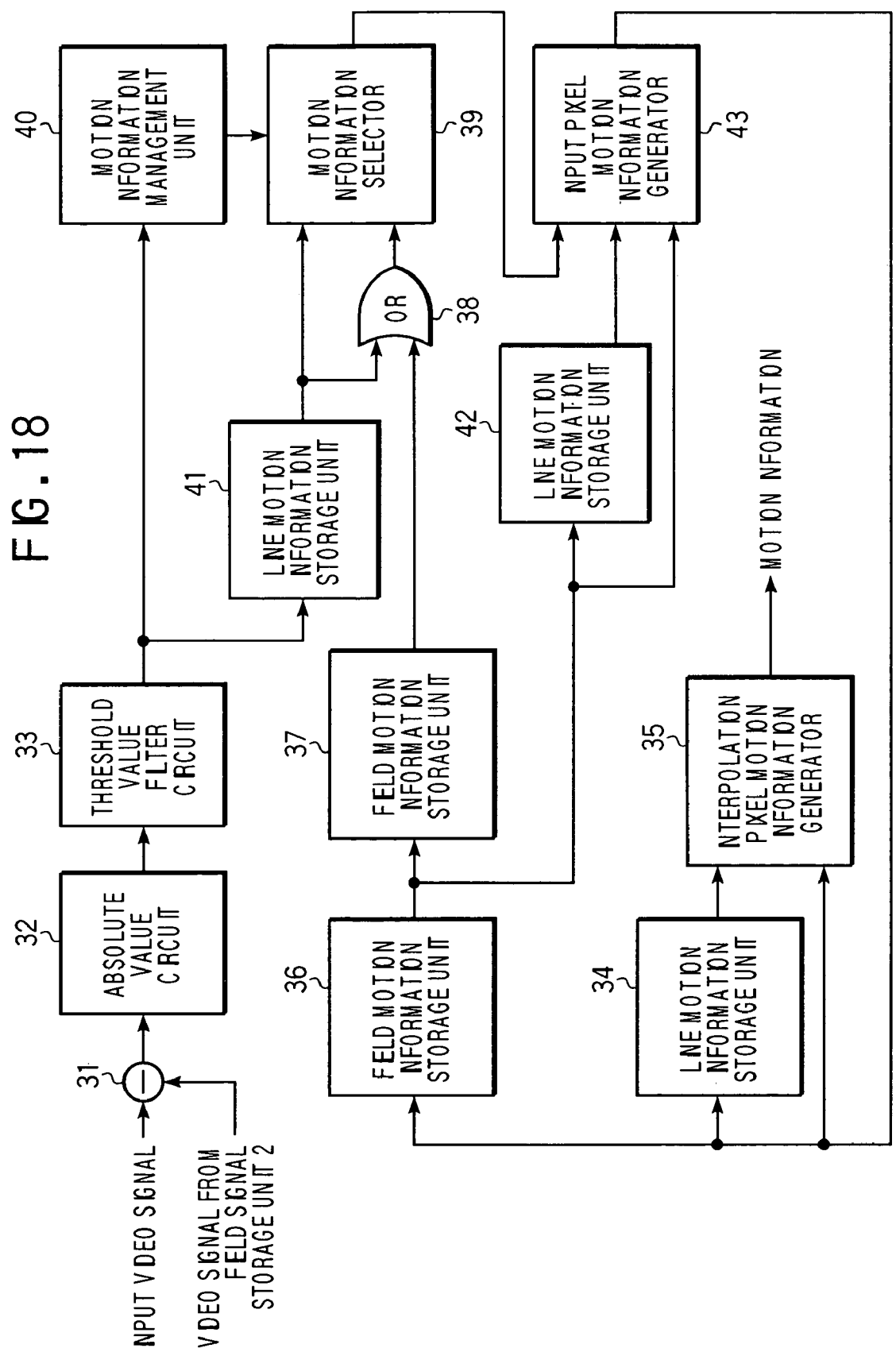
FIG. 18 is a block diagram illustrating the structure of a motion information processing apparatus in accordance with a fourth preferred embodiment of the present invention.

FIG. 18 is a block diagram illustrating an motion information processing apparatus in accordance with a fourth preferred embodiment of the present invention. The motion information processing apparatus of the fourth preferred embodiment is appropriately used as the motion information generator 3 in the IP converter of FIG. 3.

In accordance with the fourth preferred embodiment of the present invention, the pixel-by-pixel motion information is determined by referencing the motion information determined in the prior field in addition to the motion information determined in the prior frame when motion information as a moving picture is detected a predetermined area. Means for storing, for one frame period, the pixel-by-pixel motion information thus obtained is arranged. When the motion information as the moving picture is detected in a predetermined area, the motion information determined in the prior field and the motion information determined in the prior frame are referenced. The motion information at the interpolation pixel is thus determined without arranging any separate means for accounting for the motion information in the prior field.

The difference between the motion information processing apparatus of FIG. 18 and the motion information generator 3 of FIG. 5 is that a line motion information storage unit 42 and an input pixel motion information generator 43 are added. The line motion information storage unit 42 stores, on a per line basis, the motion information output from the field motion information storage circuit 36. The input pixel motion information generator 43 determines the motion information of the input pixel based on the motion information output from the motion information selector 39 and the motion information output from the field motion information storage circuit 36 and the line motion information storage unit 42. Each of the field motion information storage circuit 36 and the line motion information storage unit 34 receives the motion information output from the input pixel motion information generator 43. The interpolation pixel motion information generator 35 receives the motion information output from the input pixel motion information generator 43 and the motion information output from the line motion information storage unit 34.

If a pixel determined to be a moving picture within the area managed by the motion information management unit 40 is not detected, the motion information selector 39 directly outputs the motion information determined from the inter-frame difference information. If a pixel determined to be a moving picture within the area managed by the motion information management unit 40 is detected, the motion information selector 39 outputs the motion information that is determined by referencing the motion information in the past field one frame before output from the field motion information storage circuit 37, in addition to the motion information determined from the inter-frame difference information. The input pixel motion information generator 43 receives the motion information output from the motion information selector 39, the motion information in the past field that is output from the field motion information storage circuit 36, and is one field before the motion information output from the motion information selector 39, and the motion information in the past field that is output from the line motion information storage unit 42 and is one field before the motion information output from the field motion information storage circuit 36. The input pixel motion information generator 43 determines the motion information of the input pixel.

Figure 19:
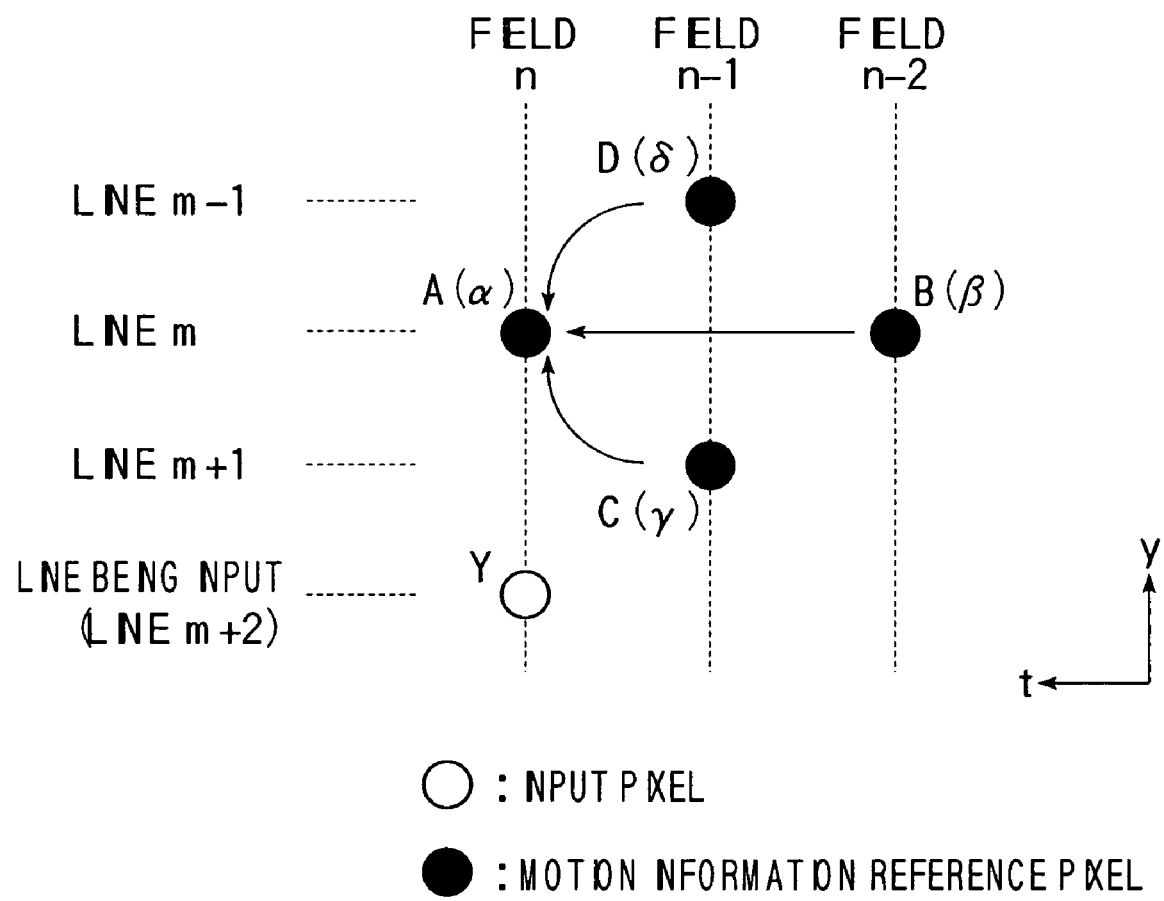
FIG. 19 diagrammatically illustrates the relationship between a pixel and the motion information of the pixel.

FIG. 19 illustrates how the motion information of the input pixel is determined by the input pixel motion information generator 43. The input pixel motion information generator 43 may be constructed of a three-input OR gate.

If the pixel determined to be a moving picture in the area managed by the motion information management unit 40 is detected, the motion information selector 39 selects and outputs the motion information output from the OR gate 38. The OR gate 38 here OR gates the motion information output from the line motion information storage circuit 41, and the motion information output from the field motion information storage circuit 37. More specifically, as shown in FIG. 19, the input video signal is the pixel Y at the line (m+2) in the field n. Since the input video signal is interlace-scanned signal, the motion information output from the line motion information storage circuit 41 is the motion information α of the pixel A at the line m in the field n. The motion information output from the field motion information storage circuit 37 is the motion information at the pixel delayed by two field periods from the currently input pixel, and is thus the motion information β of the pixel B at the line m in the field (n−2). The motion information selector 39 determines the motion information (α or β) of the pixel A at the line m in the field n by referencing the motion information α of the pixel A at the line m in the field n output from the line motion information storage circuit 41, and the motion information β at the line m in the (n−2) field output from the field motion information storage circuit 37. The motion information (α or β) of the pixel A at the line m in the field n is thus output from the motion information selector 39.

The input pixel motion information generator 43 determines the motion information of the input pixel by referencing the motion information output from the field motion information storage circuit 36 and the motion information output from the line motion information storage unit 42 in addition to the motion information output from the motion information selector 39. The motion information output from the field motion information storage circuit 36 is the motion information at the pixel delayed by one field period from the input pixel, namely, the motion information γ at the pixel C at the line (m+1) in the (n−1) field shown in FIG. 19. The motion information output from the line motion information storage unit 42 is the motion information delayed by one line period from the motion information output from the field motion information storage circuit 36, namely, the motion information δ at the pixel D at the line (m−1) in the field (n−1) shown in FIG. 19.

The input pixel motion information generator 43 references the motion information α at the pixel A at the line m in the field n output from the line motion information storage circuit 41, the motion information β at the pixel B at the line m in the field (n−2) output from the field motion information storage circuit 37, the motion information γ at the pixel C at the line (m+1) in the field (n−1) output the field motion information storage circuit 36, and the motion information δ at the pixel D at the line (m−1) in the field (n−1) output from the line motion information storage unit 42. The input pixel motion information generator 43 thus determines the motion information (α, β, γ, or δ) at the pixel A at the line m in the field n.

The input pixel motion information generator 43 may be constructed of a simple circuit such as an OR gate for OR gating the input signals. Alternatively, the input pixel motion information generator 43 may determine the motion information of the input pixel by referencing, for a plurality of pixels, the motion information output from the field motion information storage circuit 36 or the line motion information storage unit 42.

In accordance with the fourth preferred embodiment of the present invention, the motion information output from the input pixel motion information generator 43 accounts for the motion information in the prior fields as shown in FIGS. 17A-17D.

The motion information output from the input pixel motion information generator 43 is stored in the field motion information storage circuits 36 and 37 so that the motion information at the pixel delayed by one field period or by two field periods from the input pixel may be referenced. In this way, pixels determined to be a moving picture within the area managed by the motion information management unit 40 persist across a plurality frames. As along as the pixel determined to be a moving picture within the area managed by the motion information management unit 40 is detected, the motion information detected as a moving picture in the past field is maintained across a plurality of fields.

The interpolation pixel motion information generator 35 determines the motion information χ at the interpolation pixel X present between lines from the motion information output from the input pixel motion information generator 43 and the motion information ε at the pixel E one line earlier output from the line motion information storage unit 34.

Preferably, the motion information δ of the target pixel is determined and output based on the motion information γ and δ at the target pixels C and D in adjacent locations different from the field of the target pixel A.

Fifth Preferred Embodiment

Figure 20:
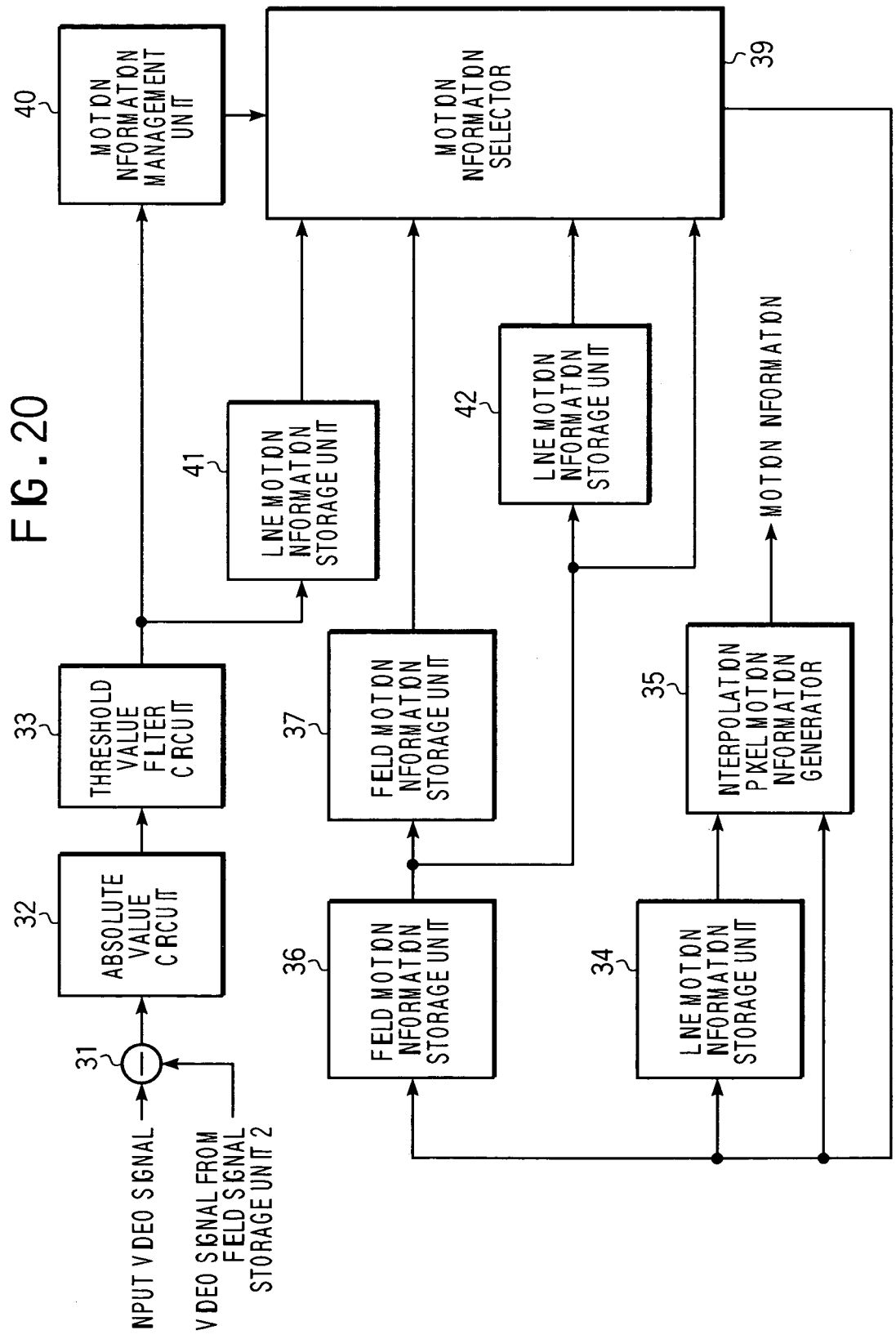
FIG. 20 is a block diagram illustrating the structure of a motion information processing apparatus in accordance with a fifth preferred embodiment of the present invention.

FIG. 20 is a block diagram illustrating the structure of a motion information processing apparatus in accordance with a fifth preferred embodiment of the present invention.

In accordance with the fourth preferred embodiment of the present invention, the motion information selector 39 selects the output from the OR gate 38 that OR gates the motion information output from the line motion information storage circuit 41 and the motion information output from the field motion information storage circuit 37, and outputs the OR gated output if the pixel determined to be a moving picture within the area managed by the motion information management unit 40 is detected. When the pixel determined to be a moving picture within the area managed by the motion information management unit 40 is detected, the motion information of the input pixel is thus determined as shown in FIG. 19 by referencing the motion information (α, δ) output from the line motion information storage circuit 41 and the line motion information storage unit 42 and the motion information (γ, β) output from the field motion information storage circuit 36 and the field motion information storage circuit 37.

In accordance with the fifth preferred embodiment of the present invention, a front end functional block in the motion information selector 39, replacing the OR gate 38 and the input pixel motion information generator 43 of FIG. 18, receives in parallel the output from each of the line motion information storage circuit 41, the line motion information storage unit 42, the field motion information storage circuit 36, and the field motion information storage circuit 37. The motion information selector 39 thus generates the motion information. With the arrangement, the fifth preferred embodiment provides the same advantages as the fourth preferred embodiment.

Sixth Preferred Embodiment

Figure 21:
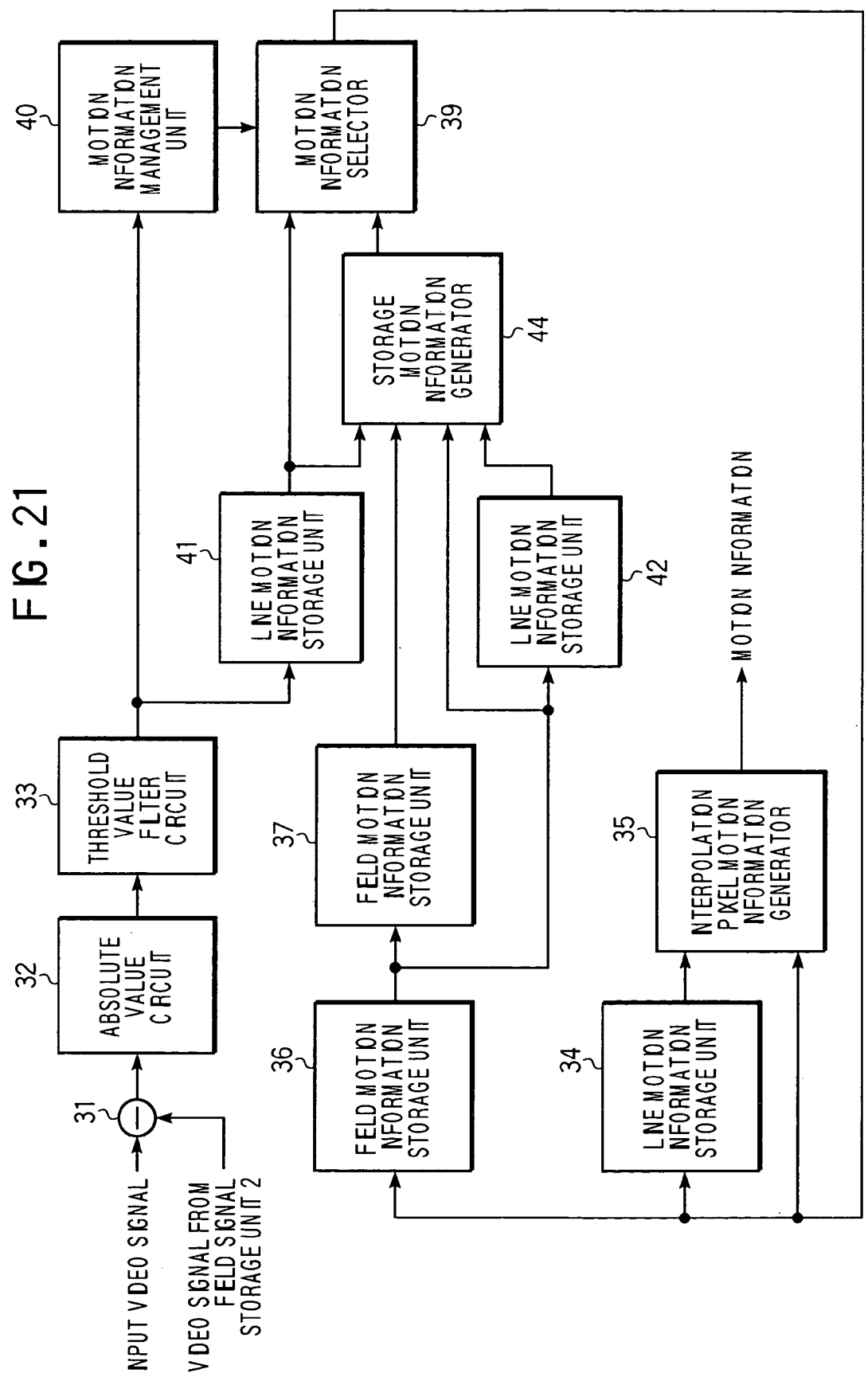
FIG. 21 is a block diagram illustrating the structure of a motion information processing apparatus in accordance with a sixth preferred embodiment of the present invention.

FIG. 21 is a block diagram of a motion information processing apparatus in accordance with a sixth preferred embodiment of the present invention. The motion information processing apparatus of the sixth preferred embodiment is appropriately used as the motion information generator 3 in the IP converter of FIG. 3.

In contrast to the arrangement of the motion information generator 3 of FIG. 18, the OR gate 38 and the input pixel motion information generator 43 are eliminated and a storage motion information generator 44 is arranged in front of the motion information selector 39 as shown in FIG. 21. The motion information output from the motion information selector 39 is input to each of the field motion information storage circuit 36 and the line motion information storage unit 34. The interpolation pixel motion information generator 35 receives the motion information output from the motion information selector 39 and the motion information output from the line motion information storage unit 34.

The storage motion information generator 44 receives the motion information output from the line motion information storage circuit 41, the motion information output from the field motion information storage circuit 37, the motion information output from the field motion information storage circuit 36 and the motion information output from the line motion information storage unit 42. The storage motion information generator 44 determines the motion information α at the pixel A at the line m in the field n by referencing these pieces of motion information as shown in FIG. 19. The storage motion information generator 44 may be constructed of a four-input OR gate. The motion information selector 39 selects and outputs the motion information output from the storage motion information generator 44 if the pixel determined to be a moving picture within the area managed by the motion information management unit 40 is detected. The motion information selector 39 selects and outputs the motion information determined from the inter-frame difference information output from the line motion information storage circuit 41 if the pixel determined to be a moving picture within the area managed by the motion information management unit 40 is not detected.

In the arrangement of FIG. 21, the motion information output from the motion information selector 39 becomes precise accounting for the motion information in the prior field as shown in FIGS. 17A-17D.

The motion information processing apparatus of FIG. 21 is different from the motion information processing apparatus of FIG. 18. When the pixel determined to be a moving picture within the area managed by the motion information management unit 40 is not detected, the motion information of the pixel is determined as accounting for the motion information in the past fields output from the field motion information storage circuit 36 and the line motion information storage unit 42 in the apparatus of FIG. 18. In the apparatus of FIG. 21, the motion information in the prior field is not accounted for.

The motion information management unit 40 determines the motion information of the pixel A by referencing the four pixels A, B, C, and D. In the case where no moving pixel is detected within the area managed by the motion information management unit 40, the possibility that pixels surrounding the pixel A are also not moving pixels is high. There is almost no difference in display performance between the apparatus of FIG. 18 and the apparatus of FIG. 21.

In accordance with the sixth preferred embodiment of the present invention, the motion information ($\alpha$, $\beta$, $\gamma$, and $\delta$) is generated based on the motion information $\alpha$ of the target pixel with respect to the pixel A in the target field, the motion information $\beta$ of the target pixel with respect to the pixel B at the same location in the field two fields before the target field, and the motion information $\gamma$ and $\delta$ of the target pixel with respect to the pixels C and D in adjacent locations in the field one field before the target field. The motion information processing apparatus of the sixth preferred embodiment then selects, as the motion information of the target pixel, between the generated motion information ($\alpha$, $\beta$, $\gamma$, and $\delta$) and the motion information $\alpha$ of the target pixel output with respect to the pixel A in the target field.

Figure 22:
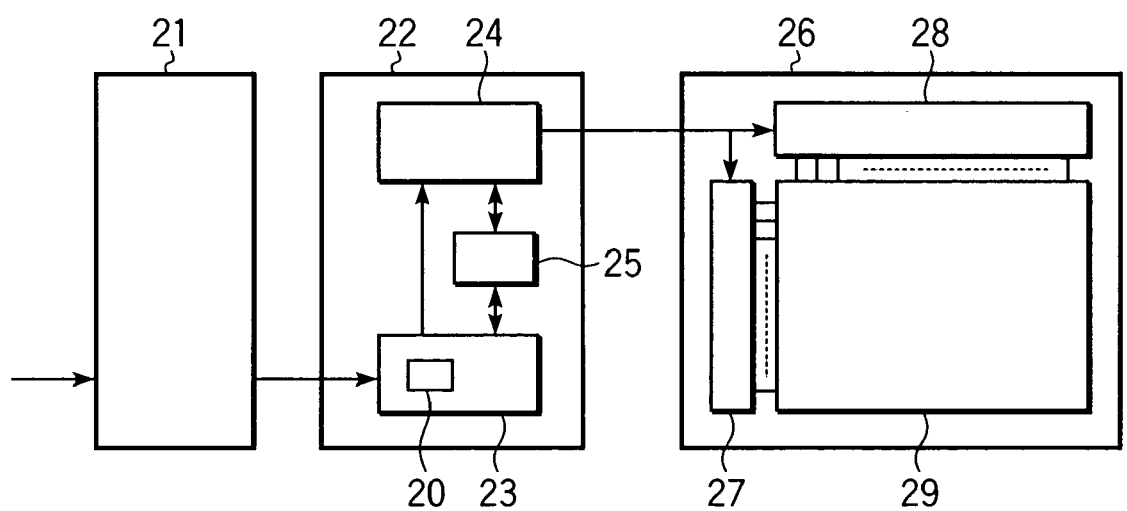
FIG. 22 is a block diagram of a video information display apparatus in accordance with one preferred embodiment of the present invention.
Figure 10A:
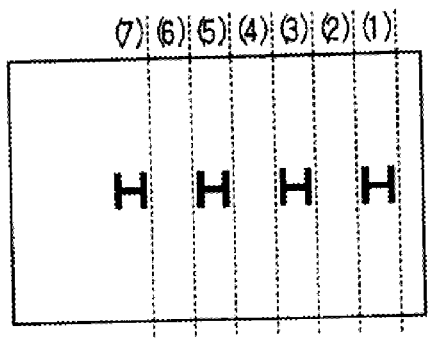
Figure 10B:
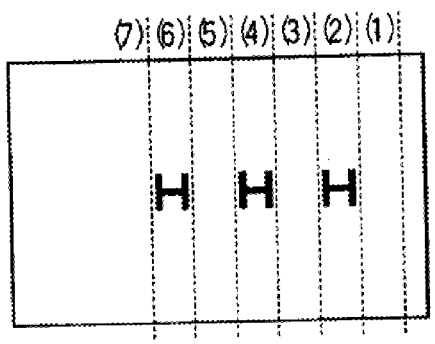
Figure 10C:
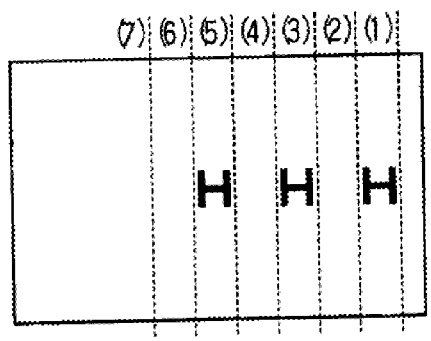
Figure 10D:
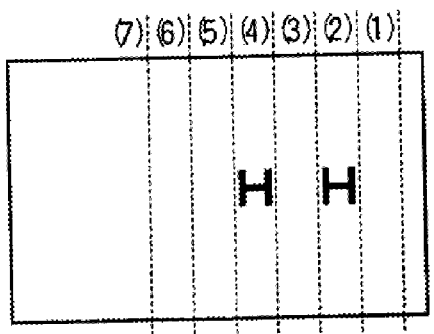
Figure 11A:
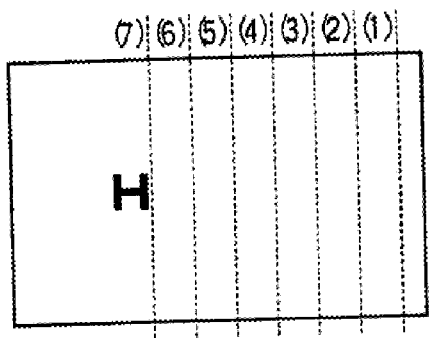
Figure 11B:
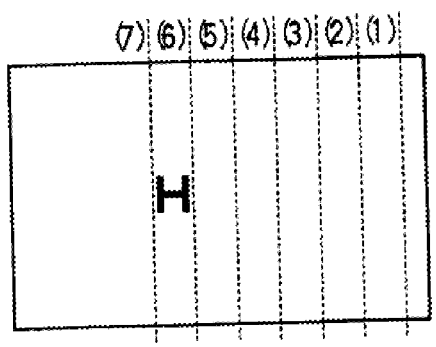
Figure 11C:
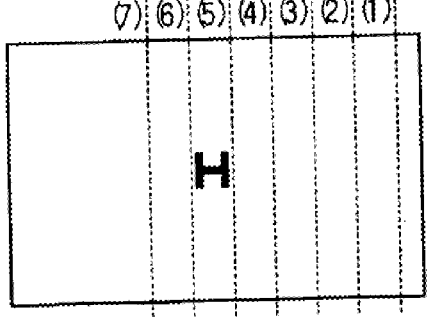
Figure 11D:
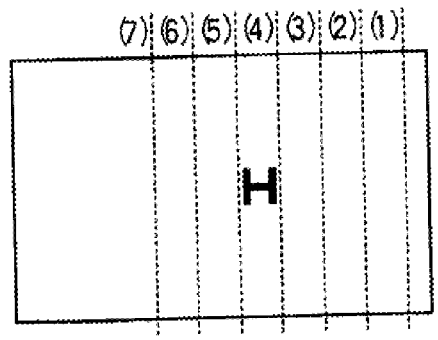
Figure 12A:
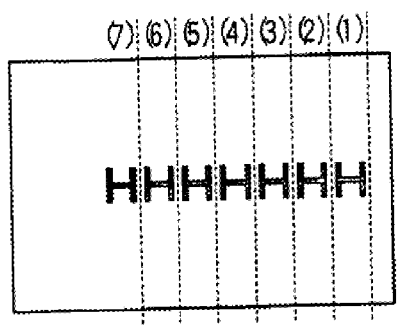
Figure 12B:
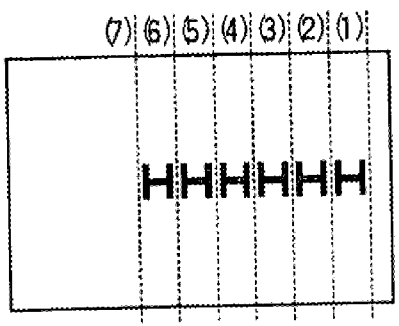
Figure 12C:
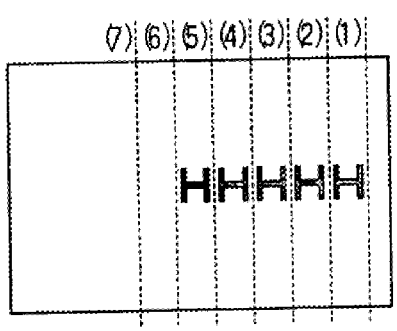
Figure 12D:
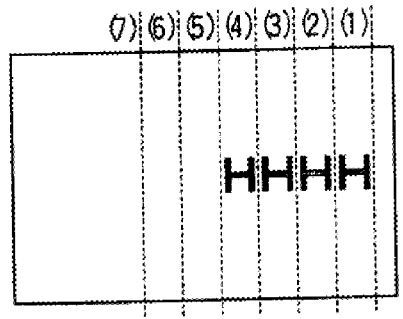
Figure 13A:
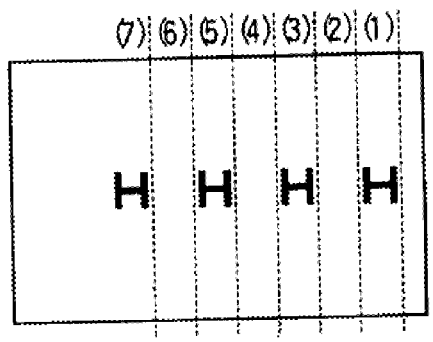
Figure 13B:
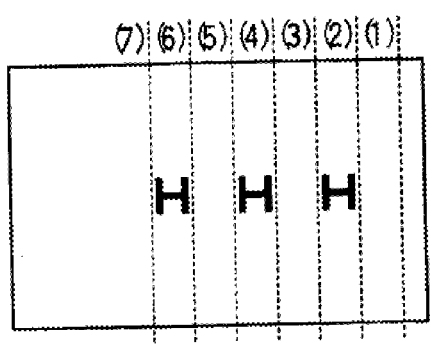
Figure 13C:
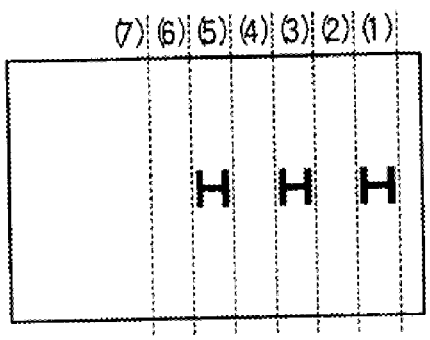
Figure 13D:
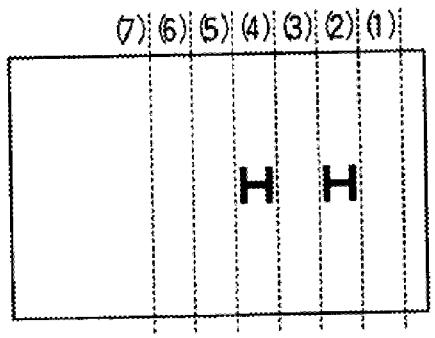
Figure 17A:
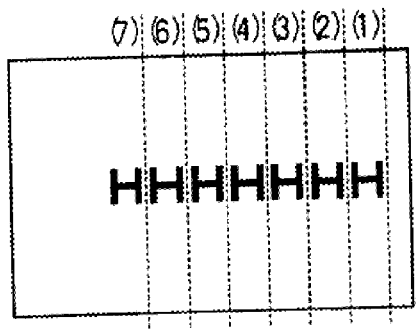
Figure 17B:
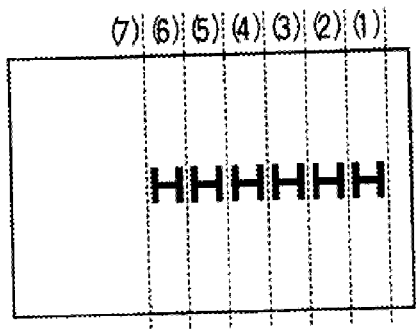
Figure 17C:
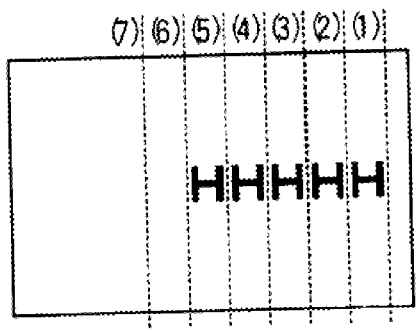
Figure 17D:
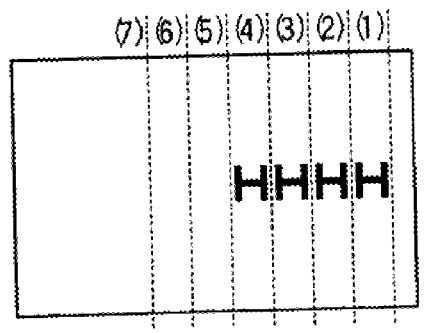

FIG. 22 is a block diagram of a video display apparatus that displays the interlace-scanned pixel signal in a progressive scan on a display.

The video display apparatus includes a video information output device 21. The video information output device 21 processes information that is received through at least one of a network such as the internet or a local-area network (LAN), digital broadcast via communication satellite or broadcasting satellite, analog broadcast, and storage media such as a memory card, a hard disk, and DVD, and outputs a interlace-scanned pixel signal (such as luminance and color difference signal, or RGB signal) to the IP converter.

A video signal processor 22 includes a video signal processor circuit 23 including a resolution converter circuit and an IP converter circuit 20 having a motion information processing circuit, a pixel signal processing circuit 24 including a $\gamma$ correction circuit and a color adjustment circuit, and a controller circuit 25 for controlling these units.

A display 26 includes a scanning line driving circuit 27, a modulated signal line driving circuit 28, and a flat panel display 29 containing fixed pixels.

The motion information processing apparatus and motion information processing method of the present invention and the IP converter and the IP conversion method in accordance therewith may be implemented using a software program on a microprocessor or hardware such as electronic circuitry. The electronic circuitry, known as design resources, is circulated in data described in hardware description language logically integrated with another functional block.

The present invention is not limited to the previously discussed preferred embodiments. It should be understood that modifications and equivalents are possible within the spirit and scope of the present invention.

In accordance with the above-referenced preferred embodiments of the present invention, the motion information as a still picture is immediately obtained at the moment a moving picture is switched to the still picture. The present invention thus prevents an erroneous display that takes when the precision of the detection of the motion information is heightened by accounting for the motion information of the reference pixel in the past field. The video signal with more precise interpolation pixels is thus generated.

In accordance with the above-referenced preferred embodiments of the present invention, the motion information accounting for the motion information in the past field is managed as one-bit information.

When moving information is detected as a moving picture within the area determined from the inter-frame difference information, the motion information of the reference pixel is generated by referencing the motion information in the field one field before, in addition to the inter-frame difference information of the reference pixel, and the motion information in the field one frame period before. The motion information accounting for the motion information of the even and odd fields is thus provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for processing motion information in an input interlace-scanned pixel signal, the method comprising the steps of:

detecting motion information, as original motion information, indicating whether a target pixel is a moving picture or a still picture based on difference information of a pixel signal at the same location between two fields;

storing the original motion information of a target pixel in a past field prior to a target field;

distinguishing whether moving pixels of at least a predetermined number are present within an area containing a plurality of adjacent pixels containing a target pixel in the target field, each of the moving pixels being a pixel of which the original motion information indicates a moving picture; and outputting the original motion information of the target pixel in the target field when the distinguishing step distinguishes that the moving pixels of at least the predetermined number are not present within the area, and determined motion information of the target pixel in the target field, the determined motion information being determined based on the motion information of the target pixel in the target field and the motion information of the target pixel in the past field at the same location, when the distinguishing step distinguishes that the moving pixels of at least the predetermined number are present in the area.

2. A method according to claim 1, further comprising a step of determining the motion information of an interpolation pixel based on the motion information corresponding to each of at least two target pixels in adjacent locations within the same field as the field of the interpolation pixel, the motion information corresponding to each of the at least two target pixels being output in the outputting step.

3. A method according to claim 1, wherein the plurality of adjacent pixels comprises all or part of the pixels that form a horizontal line or a vertical line.

4. A method according to claim 1, wherein the plurality of adjacent pixels comprises all or part of the pixels that form a plurality of adjacent horizontal lines or a plurality of adjacent vertical lines.

5. A method according to claim 1, further comprising a step of determining the motion information of an interpolation pixel based on the motion information of the target pixel output in the outputting step at the same location in a different field adjacent to the field of the interpolation pixel.

6. A method according to claim 1, wherein when the distinguishing step distinguishes that the moving pixels of at least the predetermined number are present in the area, the outputting step determines and outputs the motion information of the target pixel based on the motion information of the target pixel in the target field, the motion information of the target pixel in the past field at the same location, and the motion information of two target pixels in the adjacent field of the target field at the position adjacent to the target pixel in the target field.

7. A method according to claim 1, wherein when the distinguishing step distinguishes that the moving pixels of at least the predetermined number are present in the area, the outputting step determines and outputs the motion information of the target pixel based on (a) the motion information of the target pixel in the target field, (b) motion information of a target pixel in a field two fields before the target field at the same location as the target pixel in the target field, and (c) motion information of two target pixels in a field one field before the target field at adjacent locations to the target pixel in the target field.

8. A motion adaptive interlace-progressive conversion method, comprising the steps of:
   determining the motion information of an interpolation pixel based on the motion information of two target pixels, one target pixel at the same location as the interpolation pixel in a prior field and the other target pixel at the same location as the interpolation pixel in a subsequent field, and the motion information of two target pixels in adjacent locations in the same field as the field of the interpolation pixel, output in the outputting step according to claim 1; and
   calculating an interpolation value of a pixel signal of the interpolation pixel based on the motion information of the interpolation pixel.

9. A motion adaptive interlace-progressive conversion method according to claim 8, wherein the interpolation value of the pixel signal of the interpolation pixel is determined from pixel signals from two reference pixels at adjacent locations within the same field as the field of the interpolation pixel if the motion information of the interpolation pixel indicates a moving picture, or the interpolation value of the pixel signal of the interpolation pixel is determined from at least one of pixel signals of two reference pixels, one pixel at the same location as the interpolation pixel in a prior field and the other pixel at the same location as the interpolation pixel in a subsequent field if the motion information of the interpolation pixel indicates a still picture.

10. An apparatus for processing motion information in an input interlace-scanned pixel signal, the apparatus comprising:
   a detector for detecting motion information, as original motion information, indicating whether a target pixel is a moving picture or a still picture based on difference information of a pixel signal at the same location between two fields;
   a storing unit that stores the original motion information of a target pixel in a past field prior to a target field;
   a distinguisher for determining whether moving pixels of at least a predetermined number are present within an area containing a plurality of adjacent pixels containing a target pixel in the target field in the target field, each of the moving pixels being a pixel of which the original motion information indicates a moving picture; and
   an output unit that outputs the original motion information of the target pixel in said target field when the distinguisher distinguishes that the moving pixels of at least the predetermined number are not present within the area, and determined motion information of the target pixel in the target field, the determined motion information being determined based on the motion information of the target pixel in the target field and the motion information of the target pixel in the past field at the same location, when the distinguisher distinguishes that the moving pixels of at least the predetermined number are present in the area.

11. A motion adaptive interlace-progressive converter comprising:
   the output unit of the motion information processing apparatus according to claim 10; and
   a determining unit for determining the motion information of an interpolation pixel based on the motion information corresponding to each of at least two target pixels in adjacent locations in the same field as the field of the interpolation pixel, the motion information corresponding to each of the at least two target pixels being output from the output unit and for determining an interpolation value of a pixel signal of the interpolation pixel based on the motion information of the interpolation pixel.

12. An apparatus for processing motion information in an input interlace-scanned pixel signal, the apparatus comprising:
   detecting means for detecting motion information, as original motion information, indicating whether a target pixel is a moving picture or a still picture based on difference information of a pixel signal at the same location between two fields;
   storing means for storing the original motion information of a target pixel in a past field prior to a target field;
   distinguishing means for determining whether moving pixels of at least a predetermined number are present within an area containing a plurality of adjacent pixels containing a target pixel in the target field in the target field, each of the moving pixels being a pixel of which the original motion information indicates a moving picture; and
   output means for outputting the original information of the target pixel in the target field when said distinguishing means distinguishes that the moving pixels of at least the predetermined number are not present within the area, and determined motion information of the target pixel in the target field, the determined motion information being determined based on the motion information of the target pixel in the target field and the motion information of the target pixel in the past field at the same location, when said distinguishing means distinguishes that the moving pixels of at least the predetermined number are present in the area.

* * * * *

UNITED STATES PATENT AND TRADEMARK OFFICE
CERTIFICATE OF CORRECTION

| | |
|---|---|
| PATENT NO. | : 7,319,491 B2 |
| APPLICATION NO. | : 10/859294 |
| DATED | : January 15, 2008 |
| INVENTOR(S) | : Eiichi Matsuzaki et al. |

It is certified that error appears in the above-identified patent and that said Letters Patent is hereby corrected as shown below:

ON THE TITLE PAGE, at Item (75), INVENTORS:
"Kanagawa" should read --Tokyo-- and "Tokyo" should read --Kanagawa--.

ON THE TITLE PAGE, at Item (30), FOREIGN APPLICATION PRIORITY DATA:
"2003/160675" should read --2003-160675--.

IN THE DRAWINGS:
Sheet 10, FIG. 10C, "BERORE" should read --BEFORE--.
Sheet 11, FIG. 11C, "BERORE" should read --BEFORE--.
Sheet 12, FIG. 12C, "BERORE" should read --BEFORE--.
Sheet 13, FIG. 13C, "BERORE" should read --BEFORE--.
Sheet 17, FIG. 17C, "BERORE" should read --BEFORE--.
All as shown in the attached pages.

COLUMN 1:
Line 22, "techniques," should read --technique,--.
Line 41, "an" should read --a--.

COLUMN 2:
Line 7, "an" should read --a--.
Line 57, "illustrates" should read --illustrate--.
Line 66, "illustrates" should read --illustrate--.

COLUMN 3:
Line 1, "an" should read --a--.
Line 59, "apparatuses" should read --apparatus--.

COLUMN 4:
Line 11, "information a" should read --information $\alpha$--.

COLUMN 6:
Line 1, "$\epsilon$" should read --$\alpha$--.

UNITED STATES PATENT AND TRADEMARK OFFICE
CERTIFICATE OF CORRECTION

PATENT NO. : 7,319,491 B2  Page 2 of 7
APPLICATION NO. : 10/859294
DATED : January 15, 2008
INVENTOR(S) : Eiichi Matsuzaki et al.

It is certified that error appears in the above-identified patent and that said Letters Patent is hereby corrected as shown below:

COLUMN 8:
Line 8, "380R" should read --38 OR--.

COLUMN 9:
Line 60, "380R" should read --38 OR--.

COLUMN 10:
Line 19, "is still" should read --are still--.
Line 37, "now" should read --now be--.

COLUMN 15:
Line 25, "filed" should read --field--.
Line 29, "an" should read --a--.

COLUMN 17:
Line 39, "plurality" should read --plurality of--.
Line 39, "along" should read --long--.

COLUMN 19:
Line 40, "a interlace-scanned" should read --an interlace-scanned--.

Signed and Sealed this

Twelfth Day of August, 2008

JON W. DUDAS
*Director of the United States Patent and Trademark Office*

VIDEO INFORMATION OF
TARGET FIELD

VIDEO INFORMATION
ONE FIELD BEFORE

VIDEO INFORMATION
TWO FIELDS BEFORE

VIDEO INFORMATION
THREE FIELDS BEFORE

MOTION INFORMATION OF TARGET FIELD

MOTION INFORMATION ONE FIELD BEFORE

MOTION INFORMATION TWO FIELDS BEFORE

MOTION INFORMATION THREE FIELDS BEFORE

DISPLAY STATE OF
TARGET FIELD

DISPLAY STATE
ONE FIELD BEFORE

DISPLAY STATE
TWO FIELDS BEFORE

DISPLAY STATE
THREE FIELDS BEFORE

MOTION INFORMATION OF TARGET FIELD

MOTION INFORMATION ONE FIELD BEFORE

MOTION INFORMATION TWO FIELDS BEFORE

MOTION INFORMATION THREE FIELDS BEFORE

MOTION INFORMATION OF TARGET FIELD

MOTION INFORMATION ONE FIELD BEFORE

MOTION INFORMATION TWO FIELDS BEFORE

MOTION INFORMATION THREE FIELDS BEFORE